(12) United States Patent
Lipniarski

(10) Patent No.: US 7,234,780 B2
(45) Date of Patent: Jun. 26, 2007

(54) INDENTED FEMALE BLOW-MOLDED CONNECTOR AND MALE CONNECTOR AND METHOD

(75) Inventor: David J. Lipniarski, North Tonawanda, NY (US)

(73) Assignee: Confer Plastics, Inc., North Tonawanda, NY (US)

( * ) Notice: Subject to any disclaimer, the term of this patent is extended or adjusted under 35 U.S.C. 154(b) by 32 days.

(21) Appl. No.: 11/031,646

(22) Filed: Jan. 7, 2005

(65) Prior Publication Data

US 2005/0215104 A1 Sep. 29, 2005

Related U.S. Application Data

(63) Continuation-in-part of application No. 10/996,950, filed on Nov. 24, 2004, which is a continuation-in-part of application No. 10/314,672, filed on Dec. 9, 2002.

(51) Int. Cl.
  A47C 9/00 (2006.01)
  A47C 7/00 (2006.01)
  A47C 7/50 (2006.01)
  A47C 16/00 (2006.01)

(52) U.S. Cl. ............... 297/461; 297/423.1; 297/423.41; 297/440.1; 297/440.14; 297/440.16; 297/440.22; 297/452.2

(58) Field of Classification Search ................ 297/461, 297/440.1, 440.14, 440.16, 440.22, 423.1, 297/423.41, 451.1, 451.2, 451.8, 451.11, 297/451.13, 452.2
See application file for complete search history.

(56) References Cited

U.S. PATENT DOCUMENTS

| | | | |
|---|---|---|---|
| 2,116,444 A | 5/1938 | Maier | |
| 2,711,787 A * | 6/1955 | Hallowell, Jr. et al. | . 297/440.16 X |
| 2,946,612 A | 7/1960 | Ahlgren | |
| 3,177,035 A * | 4/1965 | Halstrick | ........... 297/440.16 X |
| 3,230,909 A * | 1/1966 | Watson | .................... 297/461 X |
| 3,230,910 A * | 1/1966 | Olssen | ........................ 297/461 |
| 3,395,642 A | 8/1968 | Foster et al. | |
| 3,674,295 A | 7/1972 | Padovani | |
| 3,770,319 A * | 11/1973 | Ono | .................. 297/423.41 X |
| 4,208,072 A * | 6/1980 | Iskendarian | .............. 297/440.1 |

(Continued)

Primary Examiner—Rodney B. White
(74) Attorney, Agent, or Firm—Roach Brown McCarthy and Gruber, P.C.; Kevin D. McCarthy

(57) ABSTRACT

A device and method for forming an indented female connector where the dimension of the indented female connector provides for removing a male molding component without damaging a set of internal ribs formed inside the female connector. A structure comprising an indented female blow-molded connector having a first wall having a top surface and a thickness, with the first wall surrounding an opening. At least one inner wall extends substantially perpendicular to the first wall and borders the opening. At least one rib is formed in the inner wall. A bottom wall is joined to the inner wall and the distance from the rib to the top surface is greater than the thickness of the first wall. The structure further comprising a male connector having a contact edge that, when positioned inside the indented female blow-molded connector, engage the at least one rib, such that the male connector and indented female blow-molded connector are releaseably joinable with one another. Structures can be made that use the indented female blow molded connectors and male connectors including braced stools having three or four legs.

15 Claims, 42 Drawing Sheets

U.S. PATENT DOCUMENTS

| | | |
|---|---|---|
| 4,312,614 A | 1/1982 | Palmer et al. |
| 4,611,964 A | 9/1986 | Schlein |
| 4,716,633 A | 1/1988 | Rizo |
| 4,803,036 A | 2/1989 | Maruhashi et al. |
| 4,811,855 A | 3/1989 | Bergström et al. |
| 5,064,247 A * | 11/1991 | Clark et al. ......... 297/440.22 X |
| 5,203,051 A | 4/1993 | Tonami |
| 5,439,269 A * | 8/1995 | Cheng ..................... 297/440.1 |
| 5,536,063 A | 7/1996 | Cable |
| 5,649,783 A * | 7/1997 | Ichikawa et al. ... 297/440.22 X |
| 5,662,381 A * | 9/1997 | Roossien et al. ... 297/440.22 X |
| 6,132,154 A | 10/2000 | Easter |
| 6,145,173 A | 11/2000 | Suzuki et al. |
| 6,149,240 A * | 11/2000 | Pietrzak ................. 297/440.22 |
| 6,324,731 B1 | 12/2001 | Pliml |
| 6,412,153 B1 | 7/2002 | Khachadourian et al. |
| 6,601,271 B1 | 8/2003 | Sommerfeld et al. |
| 6,719,365 B2 | 4/2004 | Lee |
| 6,749,265 B1 * | 6/2004 | Wang ...................... 297/440.1 |
| 7,014,266 B2 * | 3/2006 | Selby ................ 297/440.14 X |
| 7,014,267 B1 * | 3/2006 | Nagar ................... 297/440.14 |
| 7,028,859 B2 * | 4/2006 | Moon et al. ......... 297/440.1 X |
| 7,066,553 B2 * | 6/2006 | Maloney .............. 297/440.22 X |
| 2002/0153754 A1 * | 10/2002 | Huang .................... 297/461 X |

* cited by examiner

INDENTED FEMALE BLOW-MOLDED CONNECTOR AND MALE CONNECTOR AND METHOD

BENEFIT CLAIM OF AN EARLIER FILED APPLICATION

This application is a continuation-in-part patent application of currently pending patent application Ser. No. 10/996,950, filed Nov. 24, 2004, to Lipniarski for an Indented Female Blow-Molded Connector and Male Connector And Method, which is a continuation-in-part patent application of currently pending patent application Ser. No. 10/314,672, filed Dec. 9, 2002, to Lipniarski for an Indented Female Blow-Molded Connector.

FIELD OF INVENTION

The present indented female blow-molded connector and male connector relate generally to the field of molded plastic parts, and specifically relate to blow-molding a thermoplastic material into the shape of an indented female connector and the shape of a male connector such that the male connector can be joined to the indented female blow-molded connector to form stools and the like.

BACKGROUND

Blow molding of plastics to form hollow shapes such as bottles, containers and the like is well known to those having ordinary skill in the art. Some shapes, however, are difficult to mold into a hollow container with a blow molding process. An example of a shape that is difficult to mold is an indented female connector having a set of internal ribs for engaging with a male connector. Accordingly, there is a need for an improved device for molding an indented female connector as part of a hollow object. molded objects that can be assembled into sturdy durable structures, such as chairs, tables, stools, walls, and the like, without the need for extra components. There is a need for these structures to be sturdy, so that they can withstand-loads imposed on them without breaking or collapsing. There is also a need for the hollow molded objects to be formed such that they can be repeatedly manually joined and released from one another without the use of tools, wrenches, additional components, hammers, screw drivers, and/or power equipment.

SUMMARY

A male mold component is provided and is inserted into a first hollow molded object mold, to thus forming the indented female blow-molded connector in the first hollow molded object. The male mold component can be removed from the first hollow molded object without damaging ribs formed in the indented female blow-molded connector.

After removal of the male mold component, the first hollow molded object has the indented female blow-molded connector formed in a side thereof. There is also a second hollow molded object that has a male side with a male connector extending from the male side. A structure is made from the first hollow molded object and the second hollow molded object when the male connector is moved into and joined to the indented female blow-molded connector.

The indented female blow-molded connector (hereinafter female blow molded connector) has an upper or first wall having a top surface and a thickness, the first wall surrounds an opening. There is at least one inner wall that extends substantially perpendicular to the first wall and that borders the opening. There is also at least one rib formed in the inner wall, and a bottom wall is joined to the inner wall. The bottom wall can be curved. The rib, in an embodiment, can be formed from a pair of rib walls that converge at an approximately forty-five degree angle relative to the inner wall. The distance from the rib to the top surface is greater than the thickness of the first wall.

When the male connector is moved into and positioned internal to the indented female connector, the male connector becomes robustly joined to the indented female connector. This is possible, because the male connector has a contact edge that makes an interference type fit with the at least one rib of the indented female connector. It is noted that the indented female connector and male connector can be repeatedly manually joined and separated.

The indented female connector and male connector can be used to create of plurality of sturdy, stable structures. The structures can be manually assembled and disassembled without the need for tools, other parts and components, or equipment. The structures that can be formed include stools, tables, chairs, walls, and the like.

A braced stool is provided for in one of the preferred embodiments. The braced stool comprises a seat, legs, and a brace having an insertion side and an exit side. The brace has openings defined therein for receiving legs of the stool. The brace can further comprise integral wedges that extend into the openings formed in the brace, which results in a close fitting relationship between the leg and side walls that define the opening in the brace. The wedges also cause the legs to flare outwardly from the seat, and this results in the stool being more stable.

The legs advantageously are formed with ridges and grooves, such that they are corrugated. The corrugations advantageously provide the legs with increased strength. Also, protrusions are formed in the sides of the legs that contact the brace when the leg is moved into the brace opening, and the protrusions prevent the legs from moving completely through the openings formed in the brace. In one of the preferred embodiments, the brace can be formed to have four spaced apart openings for receiving four legs, such that a four-legged stool can be made. In other embodiments, the brace can have a three openings for receiving three legs, such that a three-legged stool can be made. The brace, legs, and stool seat can each comprise blow molded plastic.

The stool seat has a load side and a leg side. Indented female connectors are formed in the leg side of the seat. The indented female connectors are each surrounded by first, second, third, and fourth surfaces, respectively. The indented female connectors are formed in the seat such that that are at about a forty-five degree (45°) angle relative to the first and second surfaces. This configuration advantageously provides the braced stool with superior strength, because when the male connectors on the legs are joined with the female connectors, the legs of the stool will be better able to withstand compressive and other loading. Also, the indented female connectors are formed such that they extend into the upper or first walls formed in the seat. The upper or first walls can be angled or sloped with respect to the leg side of the seat to increase the strength and stability of the stool, and the slope of the upper wall can be between about ten degrees to fifteen degrees. In other embodiments the slope can be zero degrees, in which case the legs would be perpendicular to the leg side of the seat.

To assemble the stool, the male connector formed in the leg is moved through the insertion side of the brace. Then the male connector is moved into the female connector female connector, such that male and female connector are joined together. The braced stool can advantageously be manually assembled and disassembled without any tools or separate pieces or fasteners. More advantages of the braced stool is that it is lightweight, can be disassembled for compact storage, is of superior strength, and can withstand significant loading without collapsing.

BRIEF DESCRIPTION OF THE DRAWINGS

The indented female blow-molded connector and male connector are illustrated in the figures. Like reference characters designate the same or similar parts throughout the figures.

DETAILED DESCRIPTION

Figure 2:
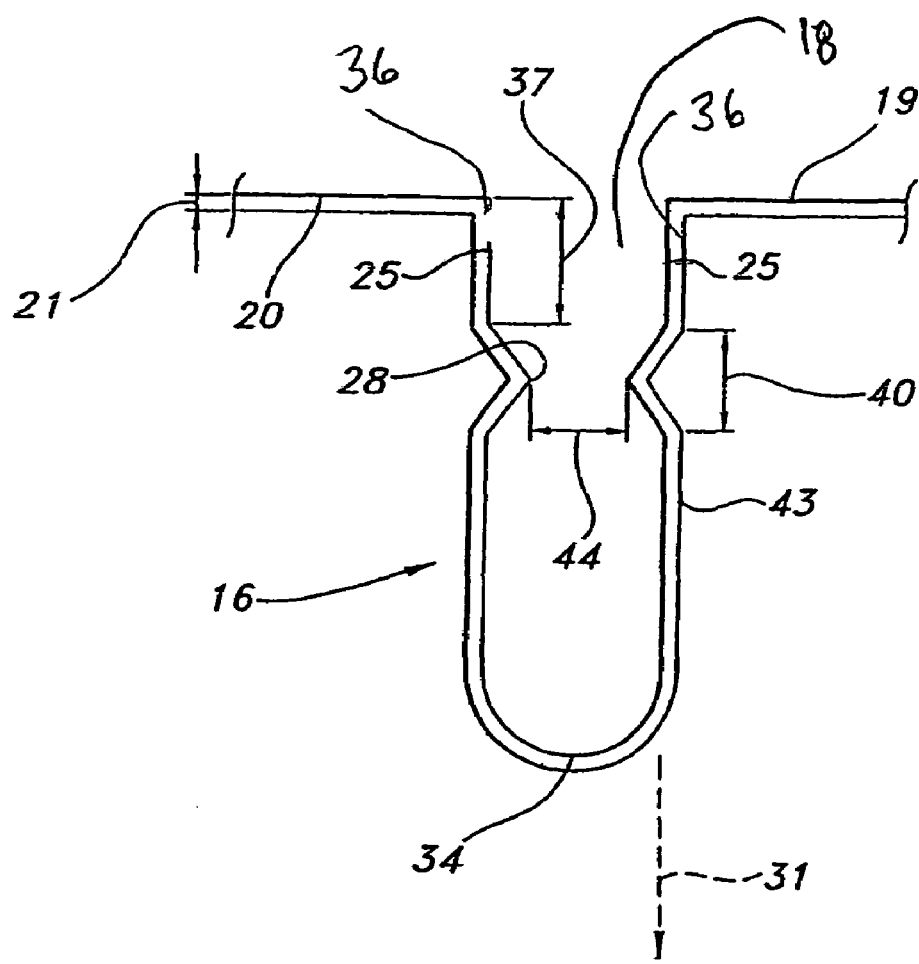
FIG. 2 is a sectional side elevational view of the indented female blow-molded connector.
Figure 1:
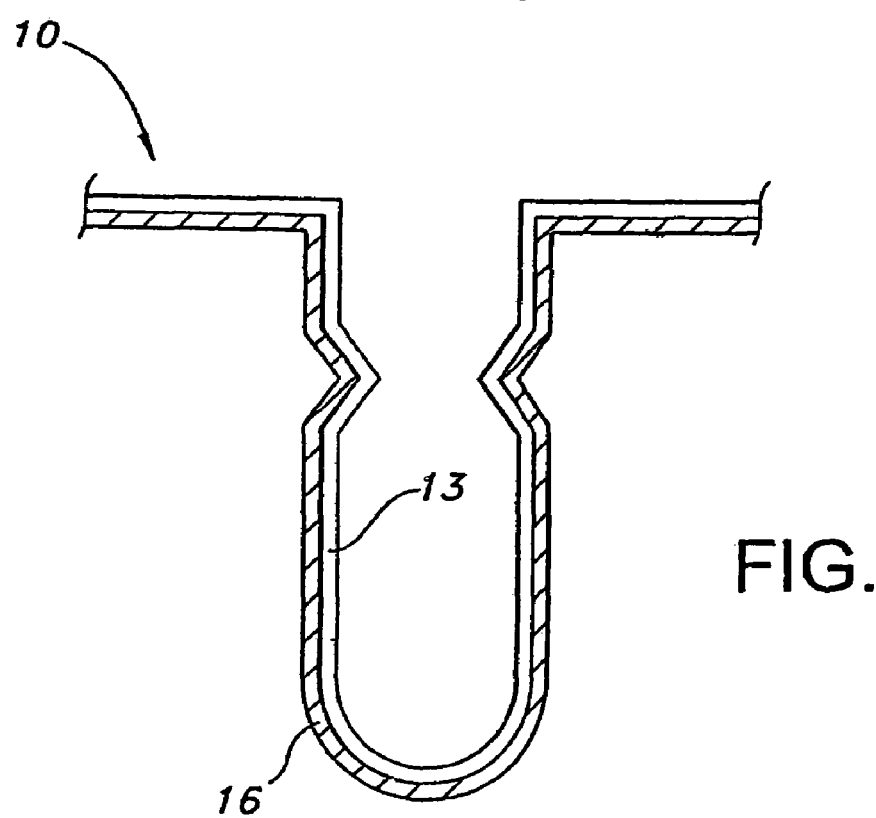
FIG. 1 is a sectional side elevational view of the male mold component positioned inside a portion of the object to be molded.
Figure 3:
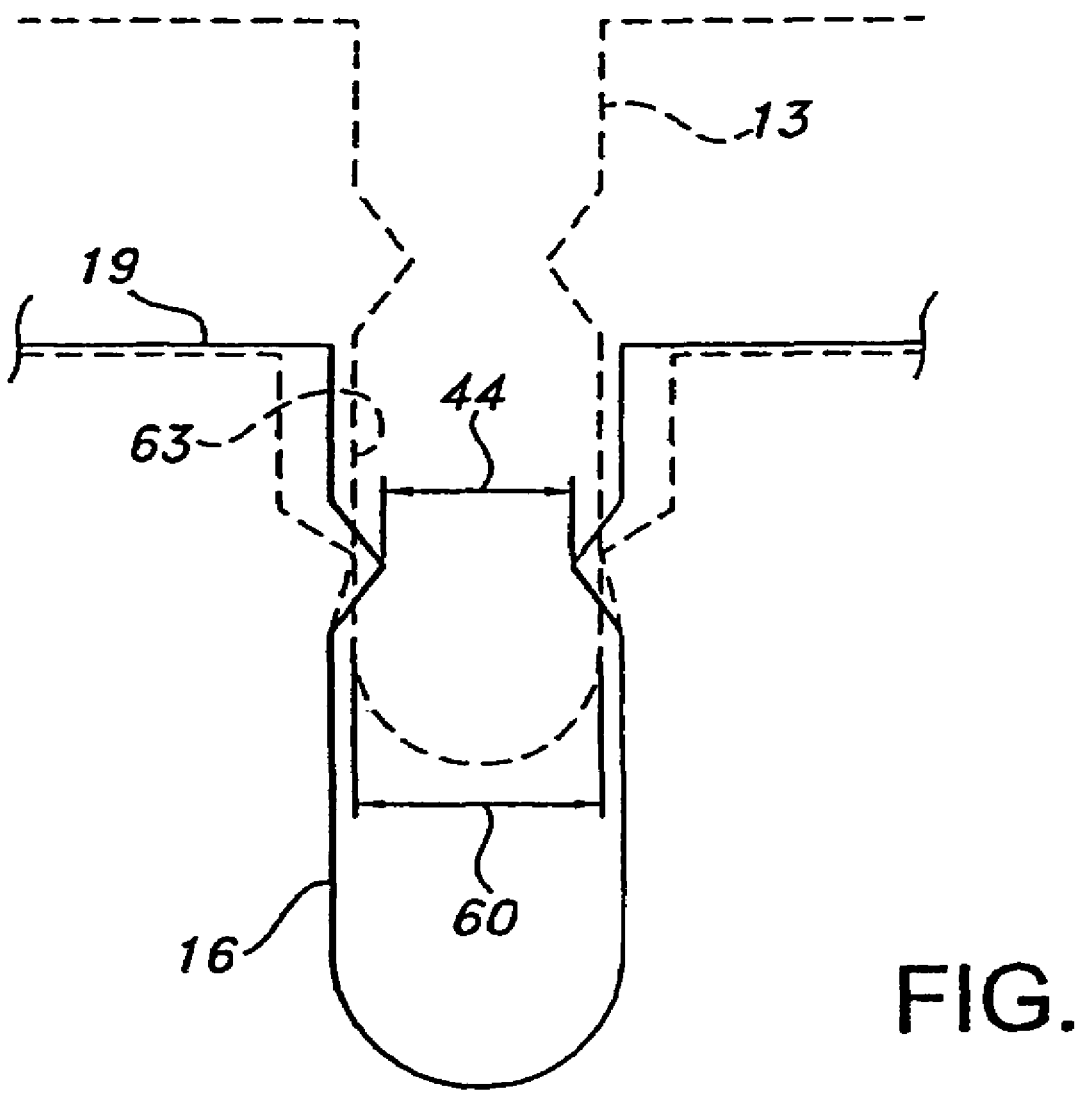
FIG. 3 is a sectional side elevational view showing the mold component in broken lines as it is being removed from the indented female blow-molded connector.

Referring generally to FIGS. 1-3 and initially to FIG. 1, a portion of a first hollow molded object 10 is shown in a sectional side view. The first hollow molded object 10 comprises an indented female blow-molded connector 16, hereinafter indented female connector 16, as shown in FIGS. 2 and 4-6. The first hollow object 10 is formed from thermoplastic materials by blow molding techniques known to those of ordinary skill in the art.

As shown in FIGS. 1 and 3 a male mold component 13 is inserted into the mold to form the indented female connector 16. Once the female connector 16 has been molded, the male mold component 13 is removed from the mold as described hereinafter. It is noted that after the male mold component 13 has been removed, a recess or opening 18 is defined in the first hollow molded object 10, as shown in FIGS. 2 and 4-6.

Figure 5:
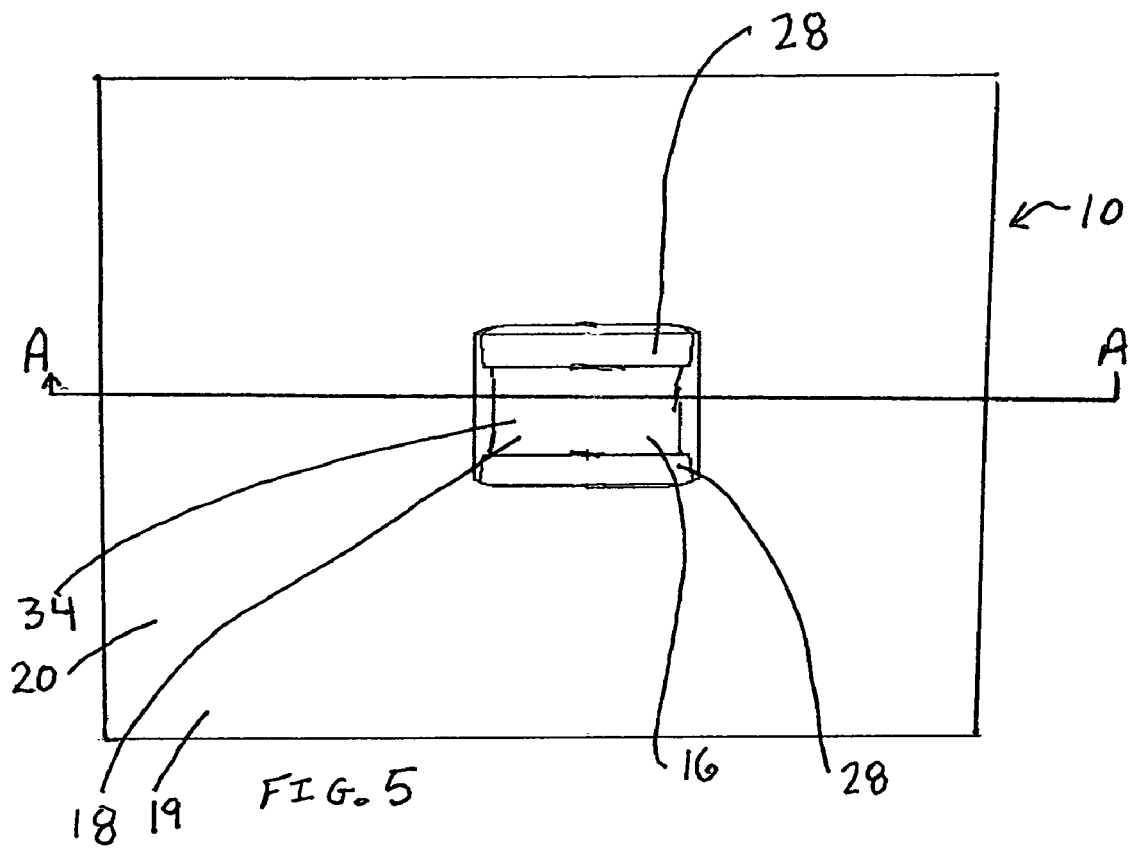
FIG. 5 is a top plan view of the first hollow molded object showing the indented female blow-molded connector.

Referring to FIG. 2, the indented female connector 16 is surrounded by a surface 19. The surface 19 is formed on an upper or first wall 20 that has a thickness indicated at 21. The surface 19 is disposed substantially perpendicular to a set of inside walls 25 extending inward toward a rib 28 that is integrally formed in the inside walls 25 during the molding process. The rib 28 is comprises a pair of converging rib walls 29. Depending on the shape of the opening, the rib 28 may be formed on some or all of the inside walls 25. For a circular opening, the rib 28 may be formed in an annular configuration. For a rectangular opening the rib 28 may extend only along the opposed major lengths of the rectangle, as shown in FIG. 5.

The rib 28 may extend from the inner wall inward at an angle of approximately forty-five degrees. As shown in FIGS. 2 and 5, there is a pair of ribs 28 facing each other and extending inward at approximately a forty-five degree angle from an axis 31 parallel to the inside wall 25. With reference to the orientation of FIG. 2, the side walls 25 may continue downward and join by means of a section 34 disposed at the portion of the female indented connector 16 positioned farthest from the surface 19. Although the section 34 is curved in the drawings, the section 34 may be formed in other shapes as well. For example, the section 34 may comprise a rectangular shape in other embodiments.

Between the top of surface 19 and the rib 28 is a flex section 36 having a dimension 37, as shown in FIG. 2. The distance along the rib is a locking surface 40, and the portion below the rib 28 is a receiving surface 43. The opening between opposed ribs 28 has a dimension 44 that will be described presently.

Turning to FIG. 3, after the blow molding process is completed, the male mold component 13 is removed from the indented female connector 16 by pulling it in a direction substantially perpendicular to top surface 19. The opening or recess 18 in the first hollow molded object 10 is narrowest at the position between the ribs 28, and this is indicated in FIG. 2 as dimension 44. When the male mold component 13 is removed from the formed indented female connector 16 as shown in FIG. 3, the ribs 28 are forced on, and as a result have to bend or flex away from each other in order to accommodate the large diameter 60 of the lower portion 63 of the male mold component 13.

Returning to FIG. 2, it has been discovered that in order to form the ribs 28 and to successfully remove the male mold component 13 without damaging the ribs 28, a certain relationship between thickness 21 of the first wall 20 and the dimension 37 applies. If dimension 37 is greater than thickness 21, then the male mold component 13 can be removed without damaging the ribs 28. If dimension 37 is less than or equal to the thickness 21, the ribs 28 are typically destroyed when the male mold component 13 is removed.

Figure 4:
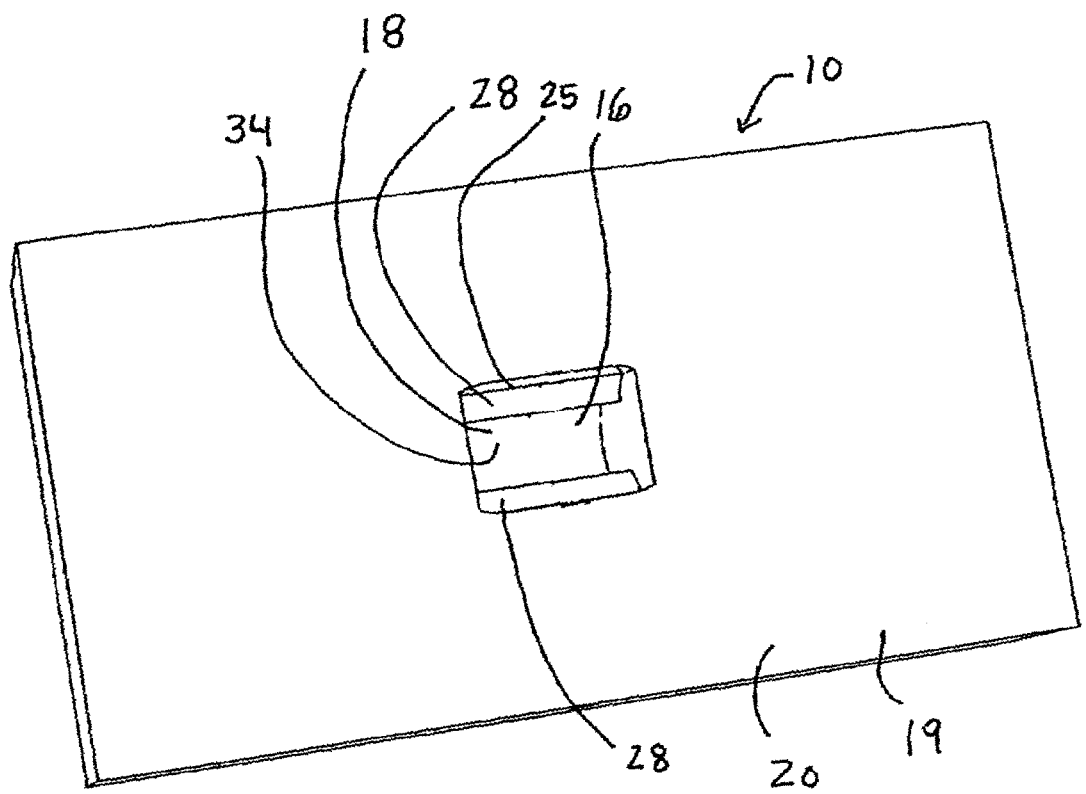
FIG. 4 is a perspective view of a first hollow molded object having an indented female blow-molded connector.
Figure 6:
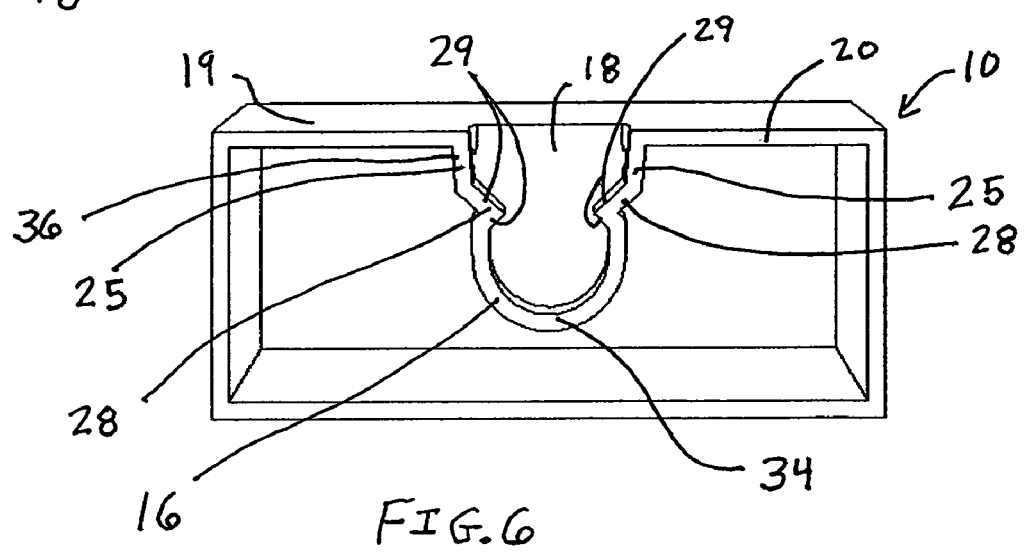
FIG. 6 is a sectional view taken along cut line A-A of the first hollow molded object showing the indented female blow-molded connector.
Figure 7:
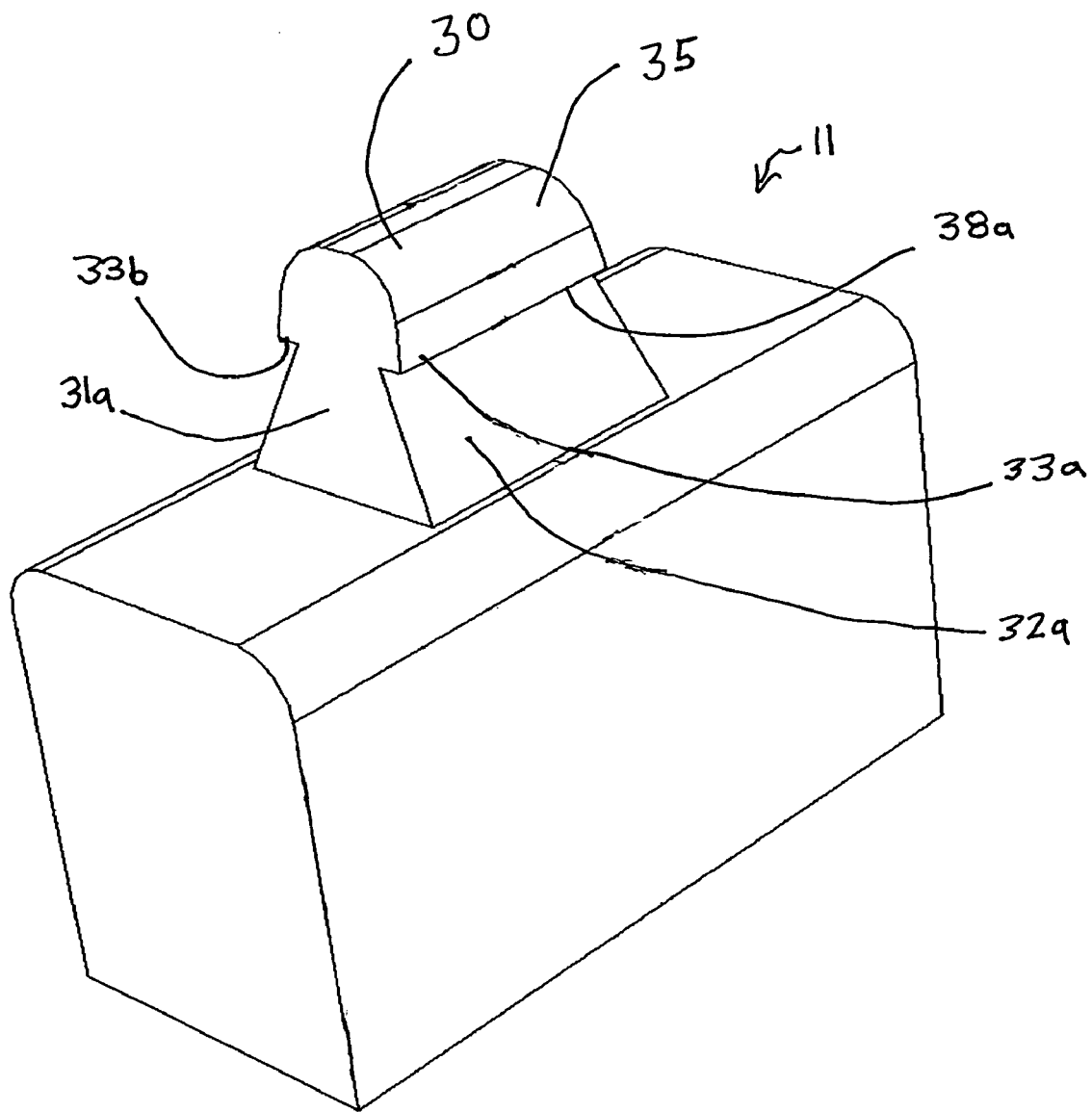
FIG. 7 is a perspective view of the second hollow molded object from which extends a male connector.
Figure 8:
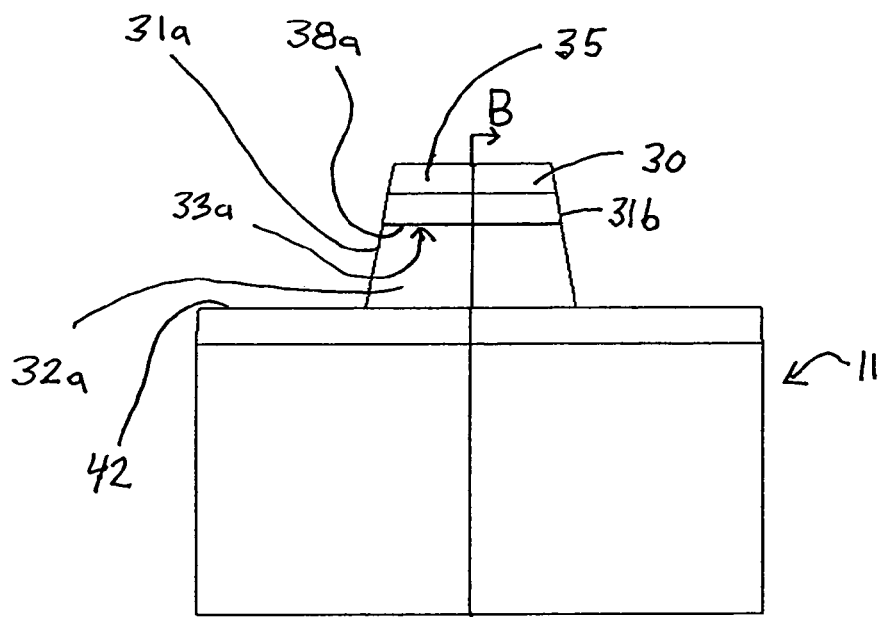
FIG. 8 is a front elevational view of the second hollow molded object showing the male connector.
Figure 9:
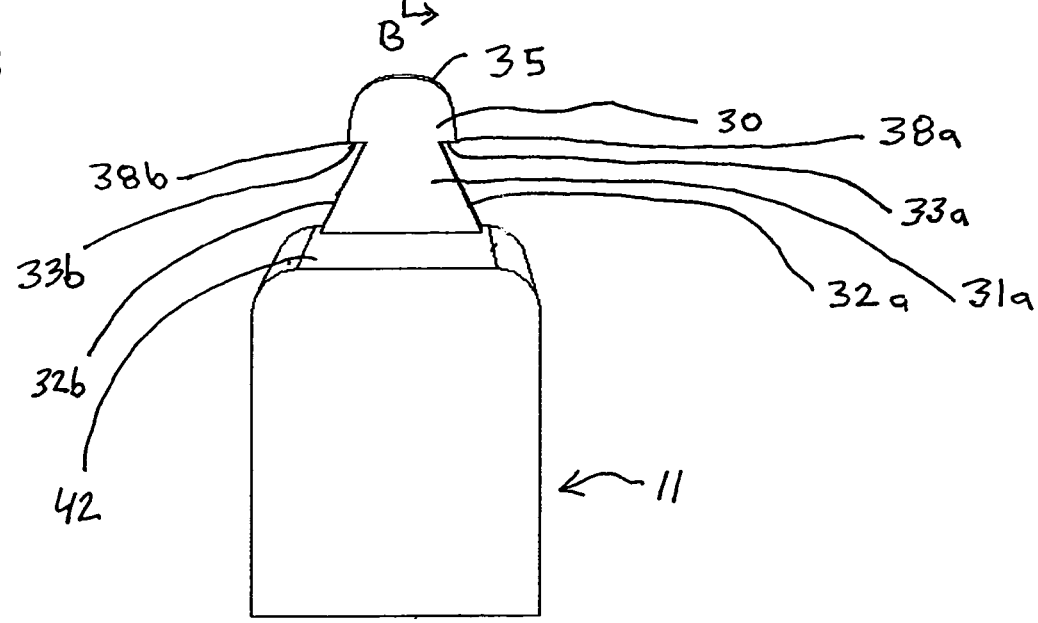
FIG. 9 is left elevational view of the second hollow molded object showing the male connector.
Figure 10:
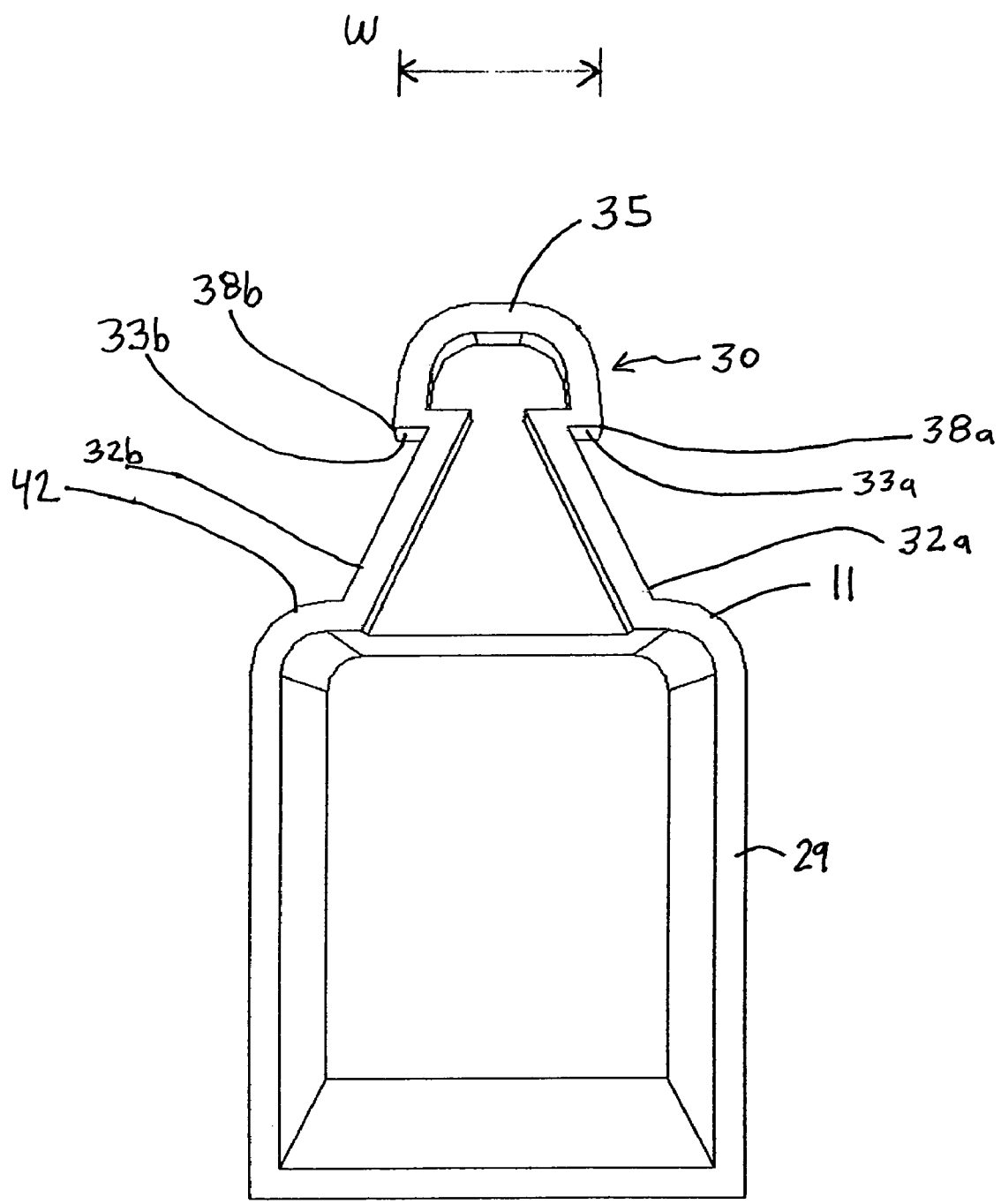
FIG. 10 is a sectional view of the second hollow molded object showing the male connector taken along cut line B-B.

FIG. 4 is a perspective view of the first hollow object 10 having a indented female connector 16 formed therein. FIG. 5 is a top plan view of the indented female connector 16 that shows the ribs 28. And, FIG. 6 is a sectional view taken along cut line A-A of FIG. 5 that shows the indented female connector 16 formed in the first hollow object 10.

A second hollow molded object 11 is provided as shown in FIGS. 7-10. The second hollow molded object 11 comprises a male side 42 and a male connector 30 that extends from the male side 42. It is noted that the second hollow object 11 is formed from thermoplastic materials by blow molding in a manner well known to those having ordinary skill in the art.

As shown in FIGS. 7-10, the male connector 30 comprises a first and second opposed walls 31a and 31b, respectively, that extend substantially perpendicular to the male side 42. Extending from the male side 42 between the first and second oppose walls, 31a, 31b, respectively, are first and second angled walls, 32a, 32b, respectively. The first angled wall 32a is joined with the first and second walls, 31a, 31b, respectively. And, the second angled wall 32b is joined with the first and second walls, 31a, 31b, respectively. A first contact wall 33a extends from the first angled wall 32a, and a second contact wall 33b extends from the second angled wall 32b.

A curved wall 35 is joined with and extends between the first and second contact walls 33a, 33b, respectively. The curved wall 35 and first contact wall 33a meet at a first edge 38a, and the curved wall 35 and the second contact wall 33b meet at a second edge 38b. The curved wall 35 is also joined with the first and second angled walls, 32a, 32b, respectively. The male connector 30 has a width designated W in FIG. 10. It is noted that in other embodiments the angled walls may be formed such that they are perpendicular to the male side 42 and perpendicular to the first and second contact walls 33a, 33b, respectively.

Figure 11:
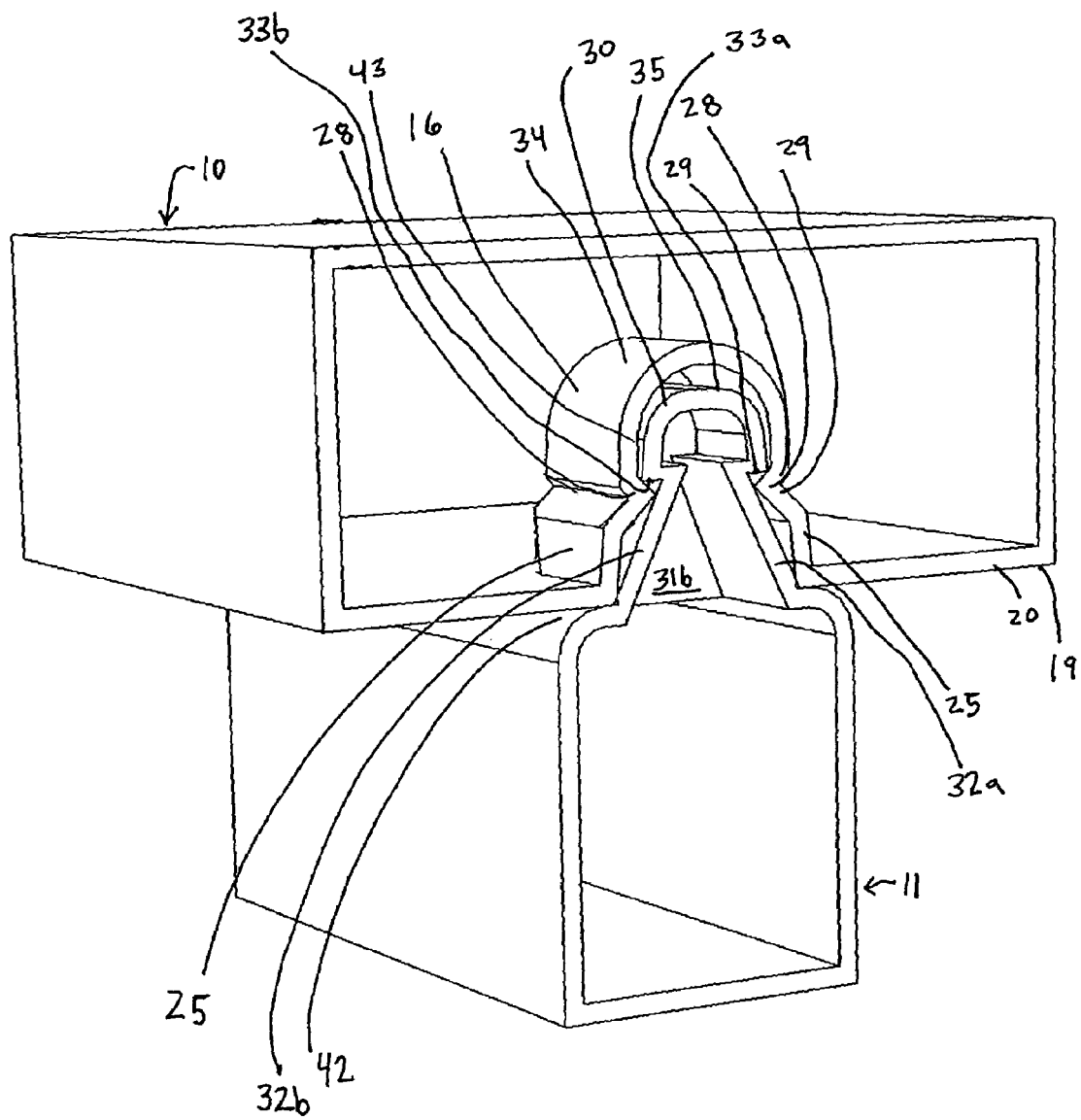
FIG. 11 is a perspective sectional view of the male connector and indented female blow-molded connector joined together.
Figure 12:
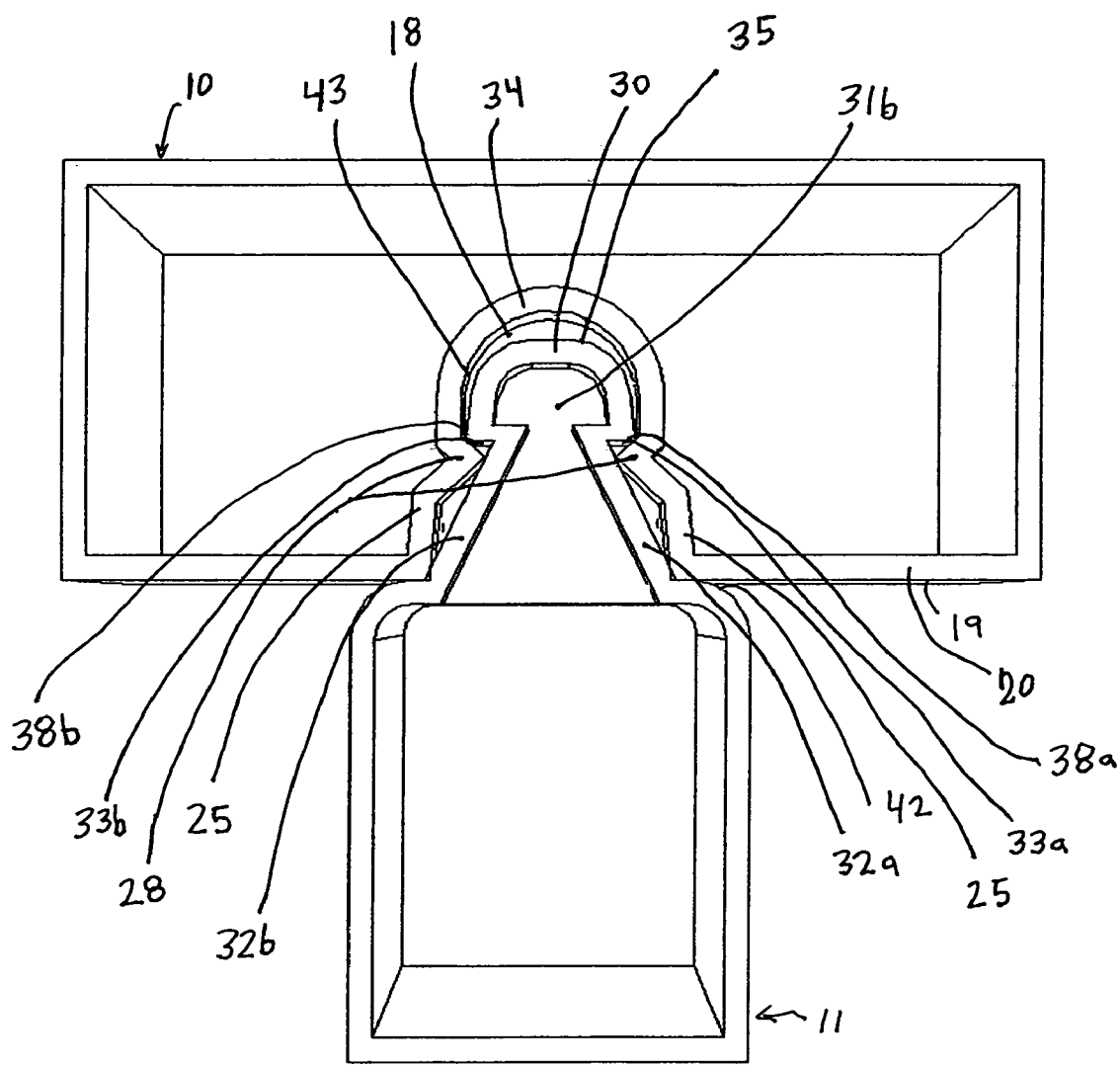
FIG. 12 is a sectional view of the male connector and indented female blow-molded connector joined together.
Figure 13:
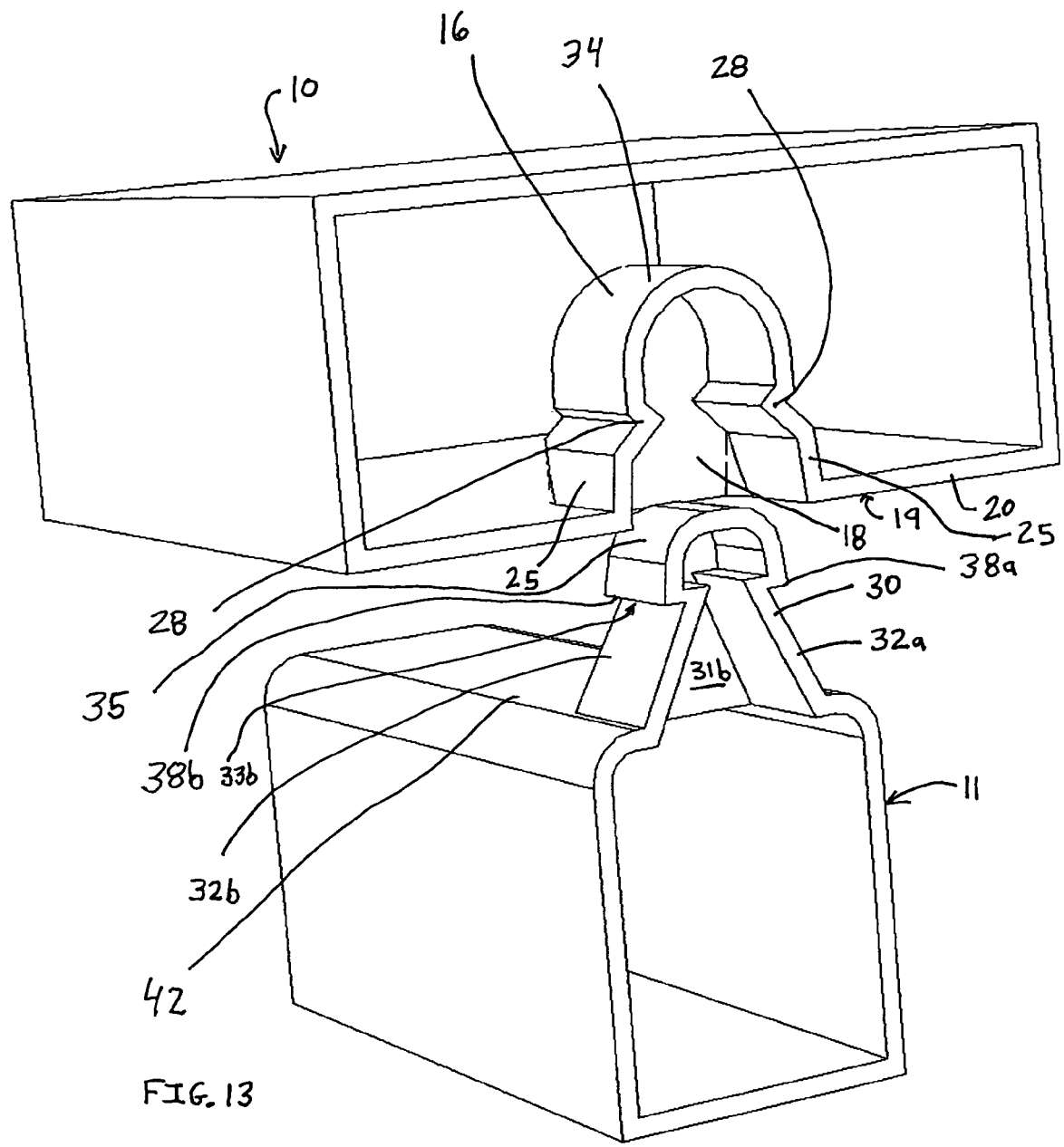
FIGS. 13-15 are perspective sectional views showing, in sequence, the introduction of the male connector into the indented female blow-molded connector.
Figure 14:
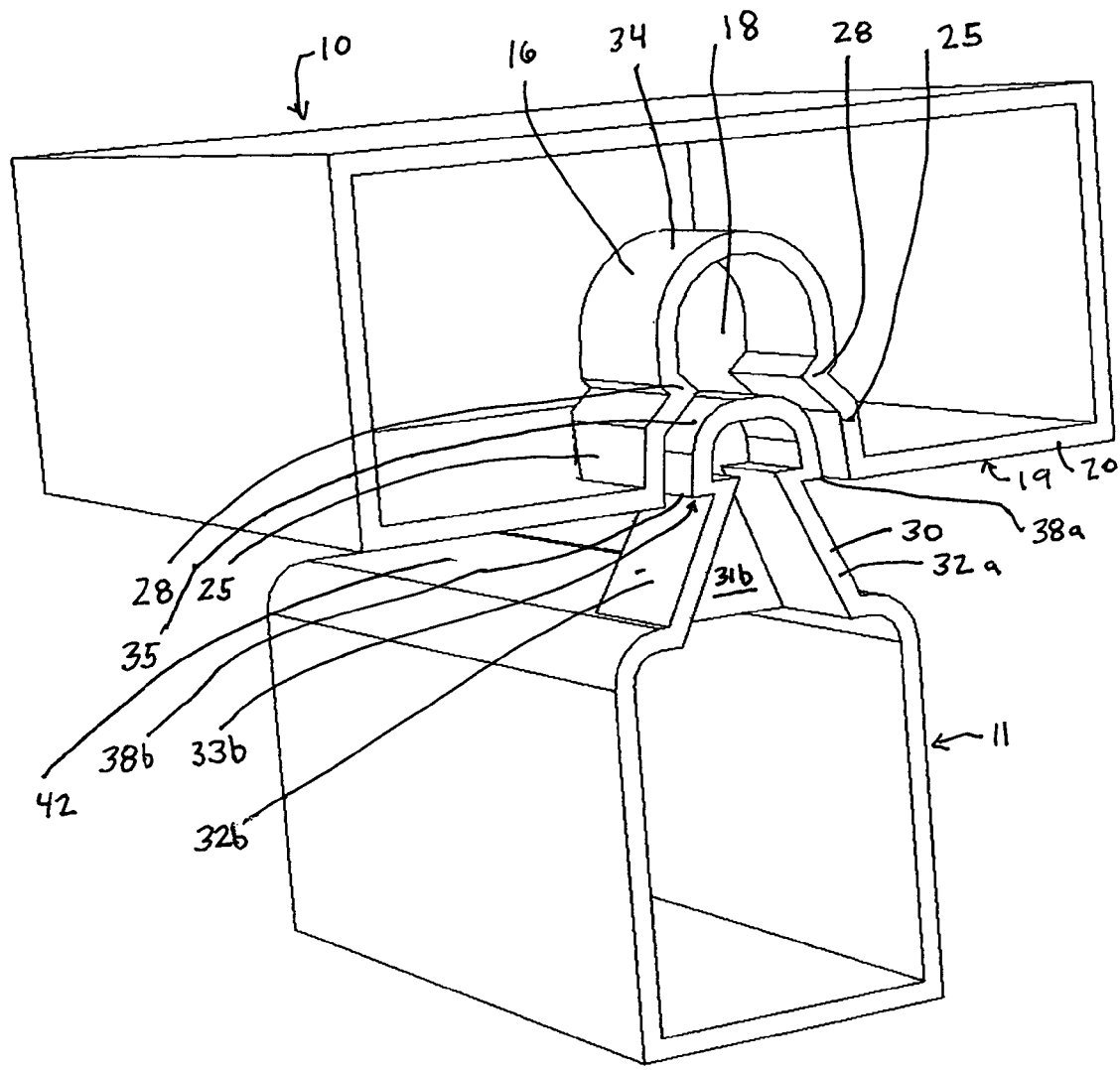
Figure 15:
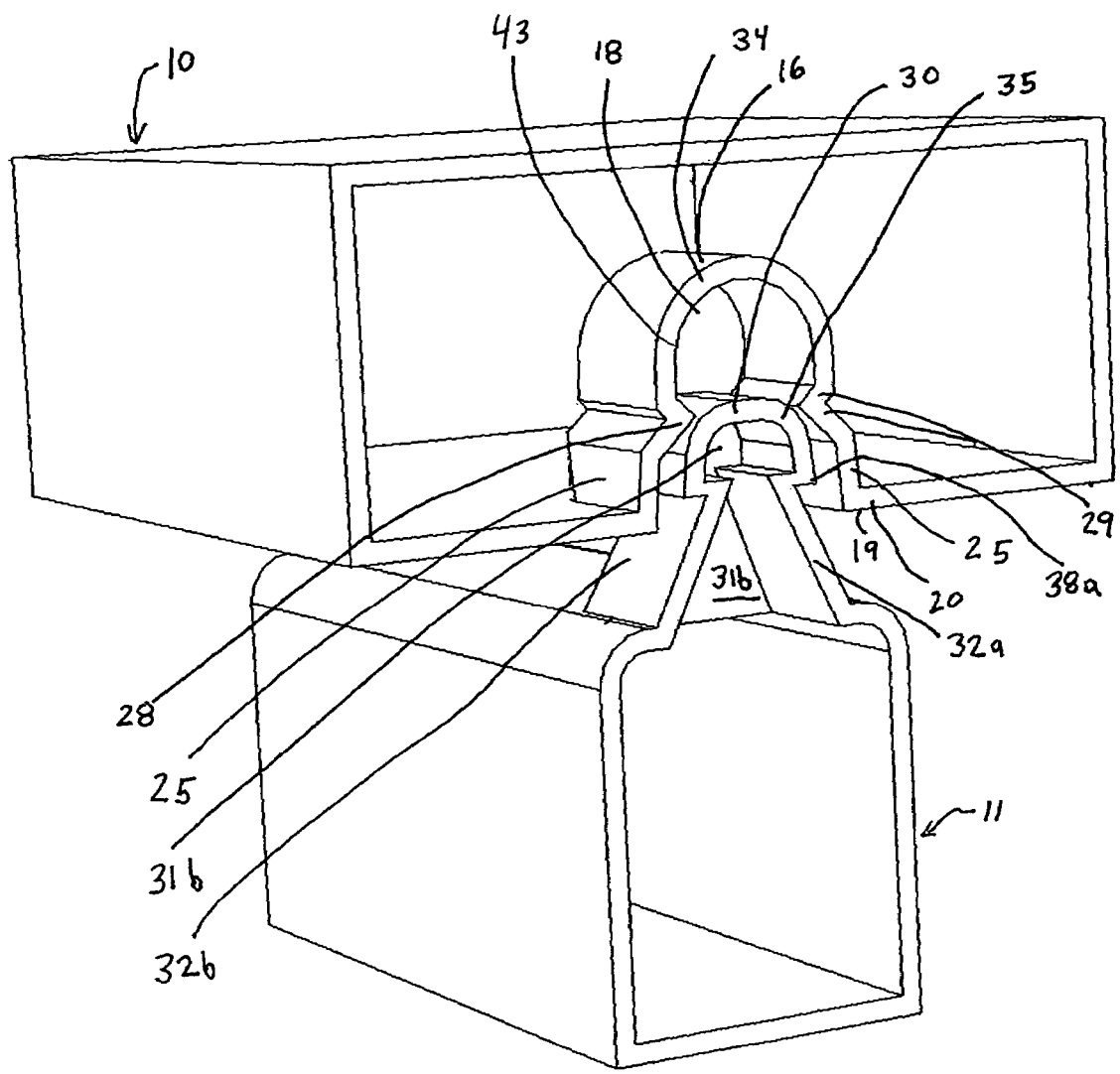

The above-described indented female connector 16 and the male connector 30 can be manually releasably joined to one another. FIGS. 13-15 show, in sequence, the male connector 30 as it is introduced into the indented female connector 16. The curved wall 35 contacts the ribs 28 that are a distance, designated dimension 44 in FIG. 2 apart from one another. Width, designated W of the curved wall 35 is greater than the distance between the ribs 28. As the curved wall 35 of the male connector 30 is introduced it contacts and forces on the ribs 28. In response, the ribs 28 expand and the curved wall 25 of the male connector 30 moves past the ribs 28. Afterward, the curved wall 35 is adjacent the section 34 of the indented female connector 16 as shown in FIGS. 11 and 12. It is noted that the above-described expansion is similar to the expansion of the ribs 28 shown in FIG. 3, showing the removal of the male mold component 13 from the indented female connector 16.

The male connector 30 is thus joined to the indented female connector 16. In particular, the first and second contact edges 38a, 38b, respectively, of the male connector 30 contact the ribs 28, thus joining or interlocking the male connector 30 to the indented female connector 16 with an interference-type fit. In this manner, the male connector 30 and indented female connector 16 are robustly joined to one another, such that there is a minimal amount of play or space for movement between them when they are so joined together. This advantageously allows for structures 46 that are sturdy and stable to be built from a plurality of first and second hollow molded objects, 10, 11, respectively, that have the above-described indented female connectors 16 and male connectors 30. As will be described presently, there are virtually a limitless number of useful structures 46 may be made from the indented female connector 16 and male connector 30.

Also, the male connector 30 and indented female connector 16 can be manually taken apart or disassembled without the use of tools, equipment, or other parts, pieces, or components. To separate or disassemble, manual force is applied to the male connector 30 and indented female connector 16 in opposite directions. During the separation process, the ribs 28 expand to allow the male component 30 to pass through the ribs 28, and the ribs 28 are not destroyed during the removal process. Advantageously, the male connector 30 and indented female connector 16 can be repeatedly joined and subsequently separated, such that structures 46 that employ the indented female connector 16 and male connector 30 can repeatedly assembled and disassembled.

Another advantage of the releasably joinable indented female connector 16 and male connector 30 is that one person can manually assemble and disassemble structures 46 without the need for other parts and components, without the need for any tools, and without the need for any separate fasteners. Advantageously, there is no possibility of small parts and pieces being lost or misplaced when the present male connector 30 and indented female connector 16 are used to form structures 46. It is noted that the male connector 30 and indented female connector 16 are durable and study. Thus, if a person uses a mallet or hammer made of, for example, rubber, plastic, wood, metal, and combinations thereof to pound the male connector 30 and indented female connector 16 together and/or apart, then the likelihood of the male connector 30 or indented female connector being damaged is low.

Figure 16:
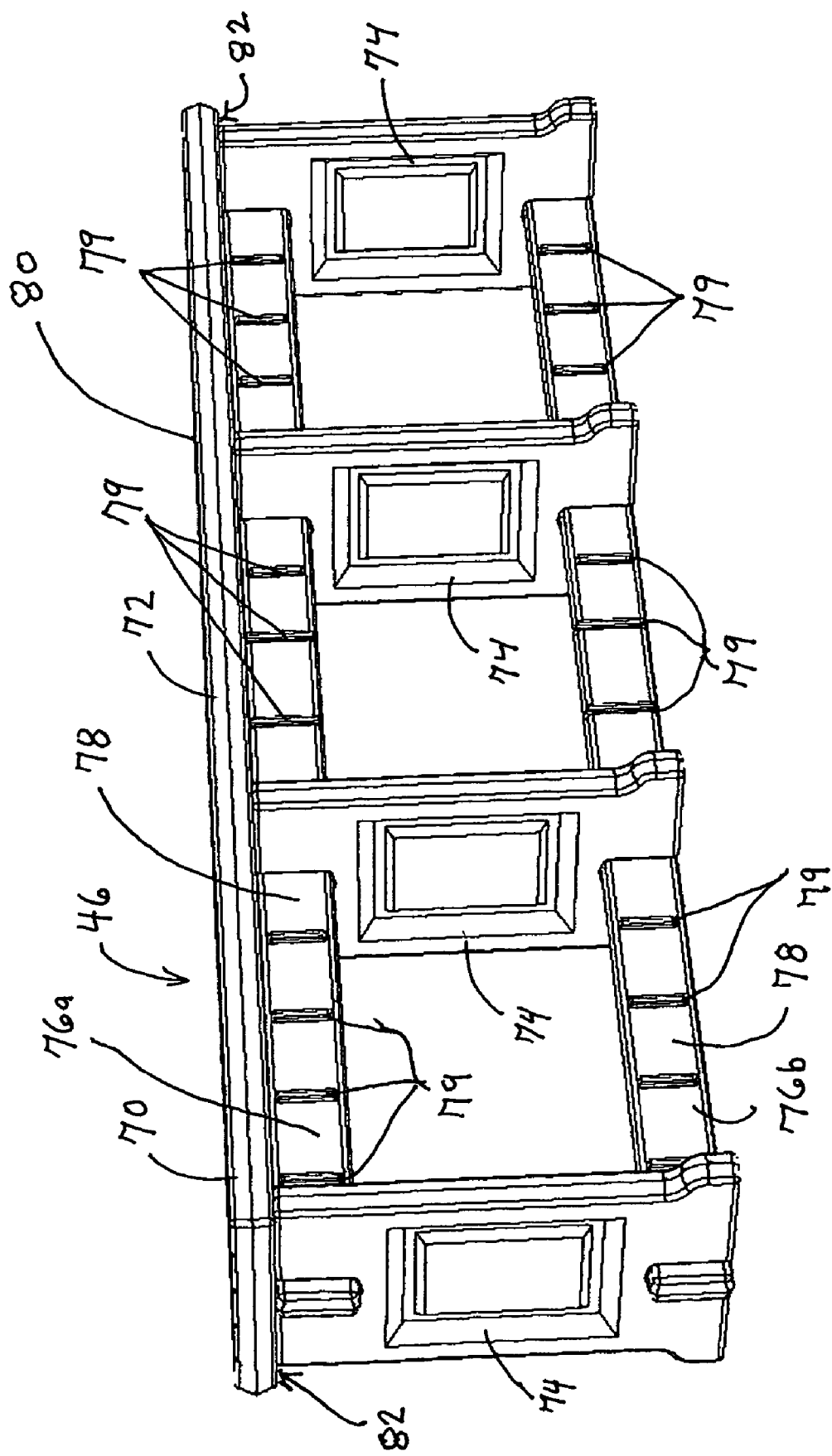
FIG. 16 is a perspective view of a structure held together with male connectors and indented female blow-molded connectors.
Figure 17:
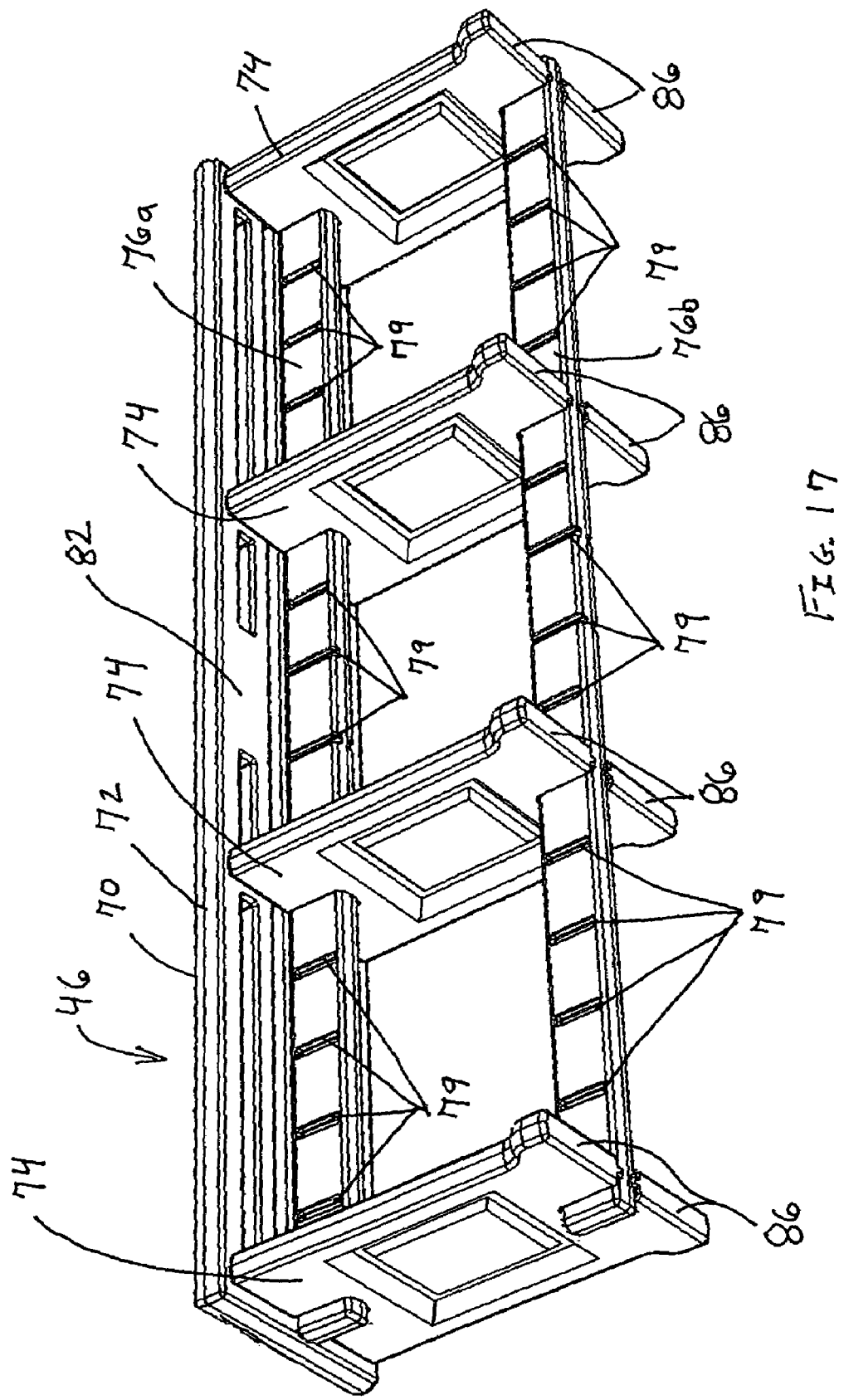
FIG. 17 is a bottom perspective view of the structure held together with male connectors and indented female blow-molded connectors.
Figure 18:
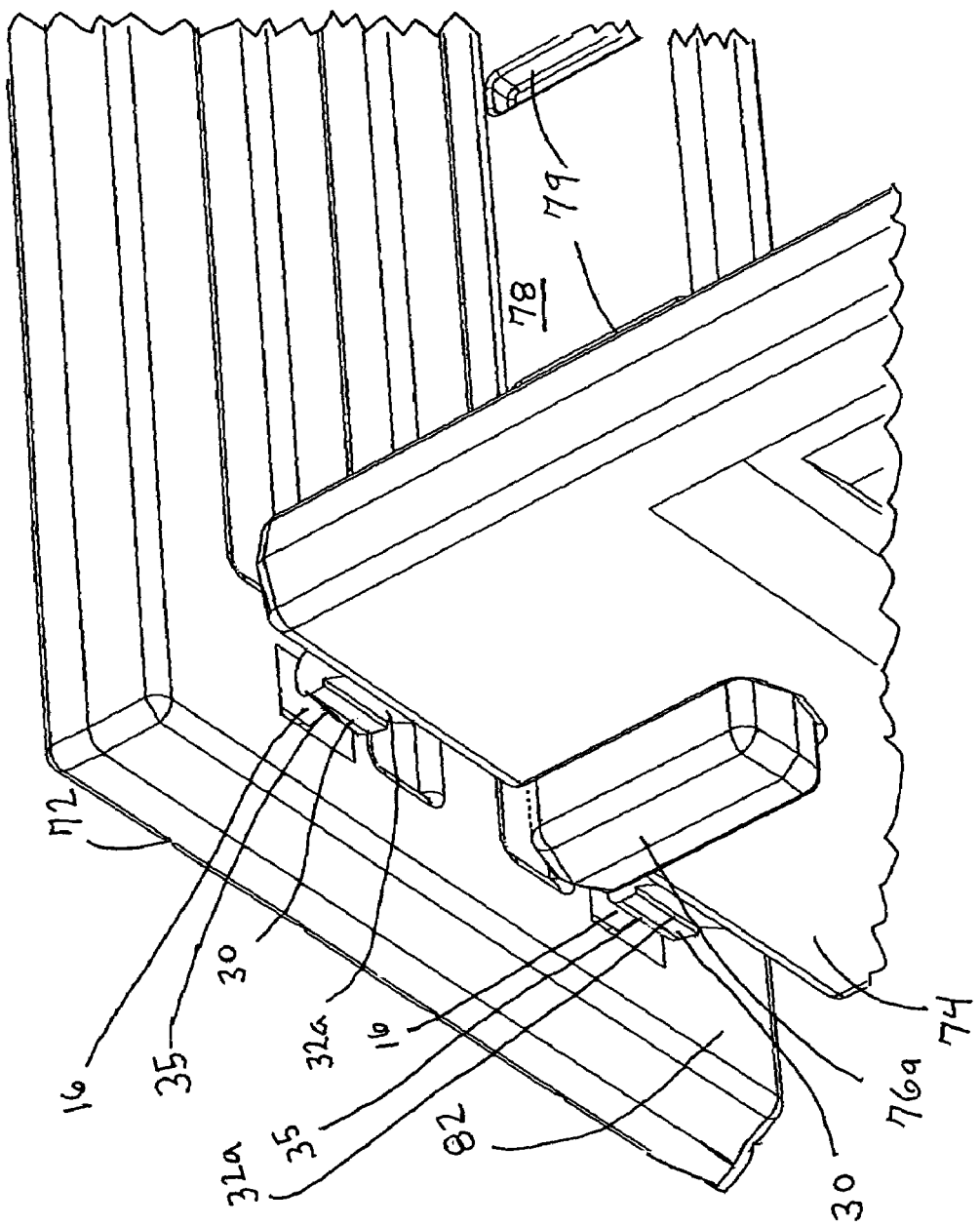
FIG. 18 is a perspective view, partly in section, showing a horizontal support member separated from a vertical support member.
Figure 19:
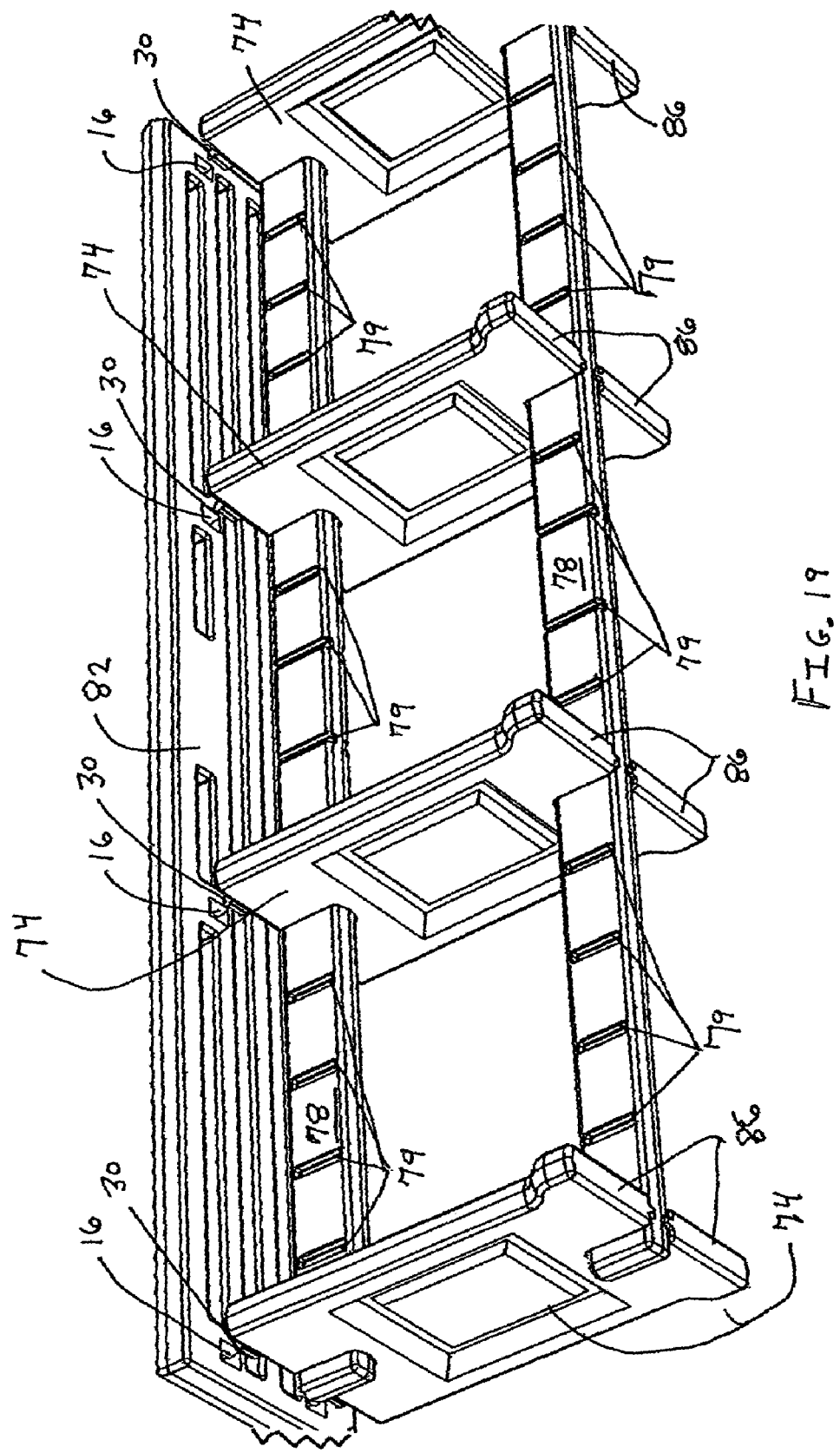
FIG. 19 is a bottom perspective view of the horizontal support member separated from the vertical support members.
Figure 20:
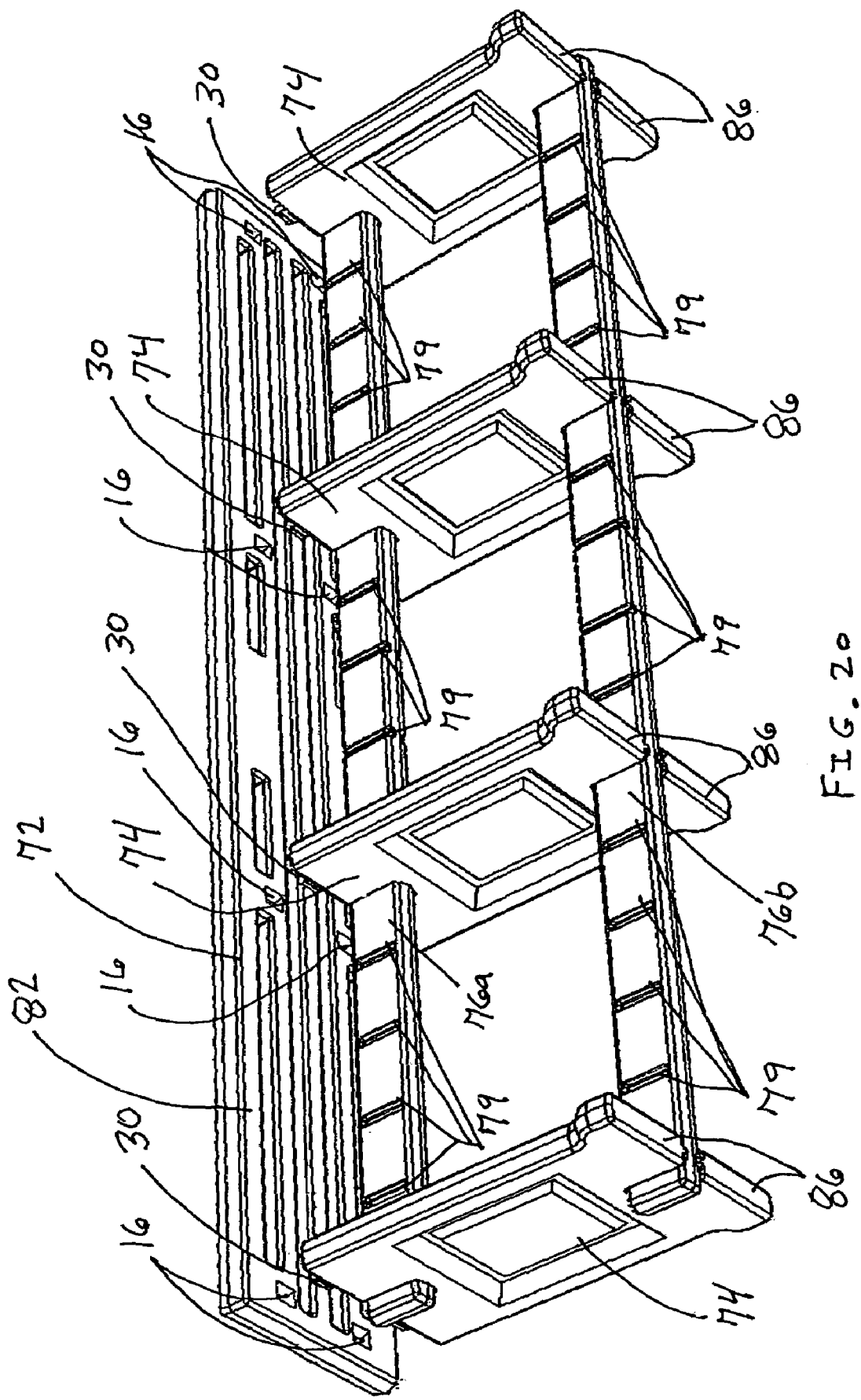
FIG. 20 is a bottom perspective view of the horizontal support member separated a greater distance from the vertical support members than is shown in FIG. 19.
Figure 21:
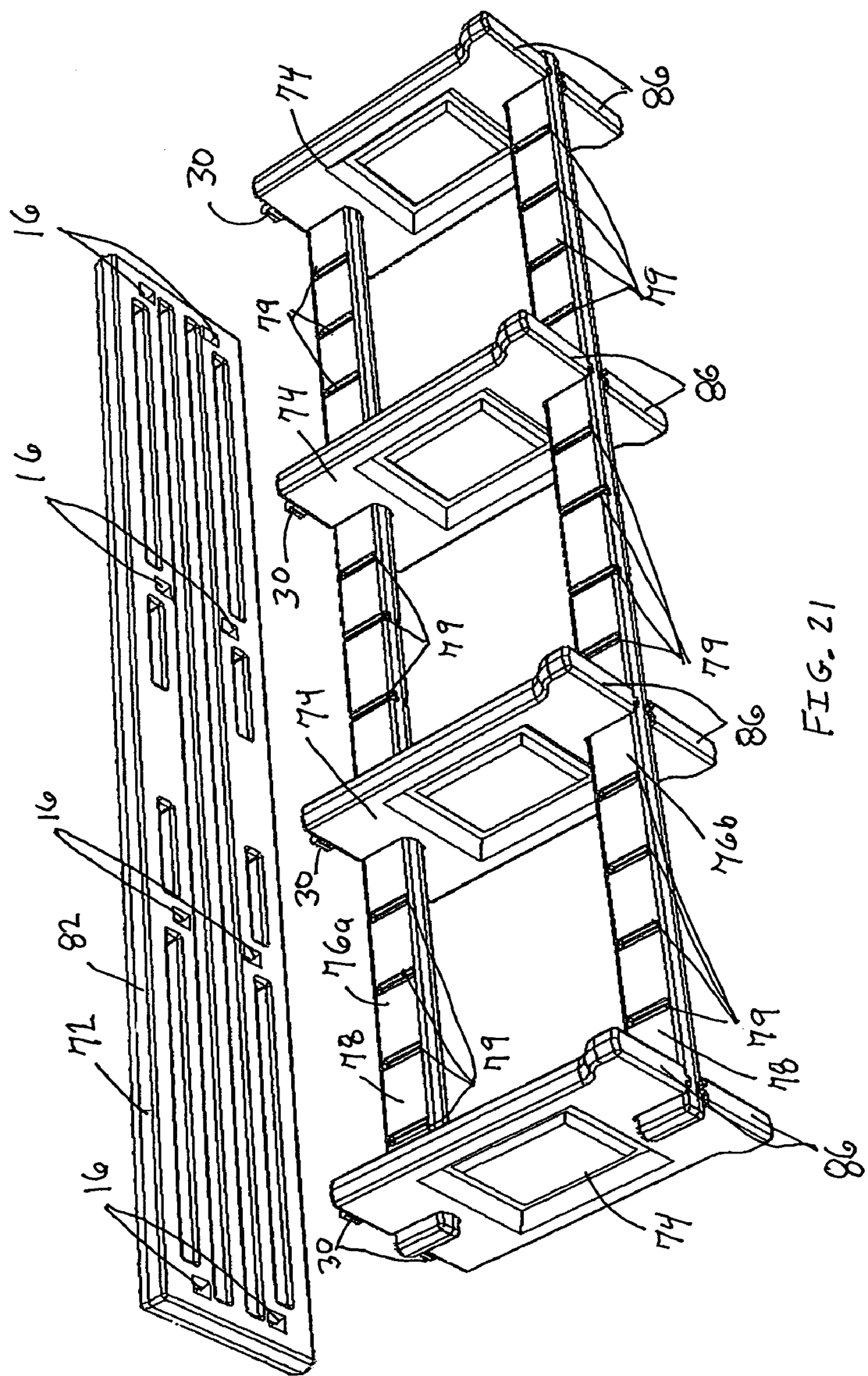
FIG. 21 is a bottom perspective view of the horizontal support member separated from the vertical support members an even greater distance than shown in FIG. 20.
Figure 22:
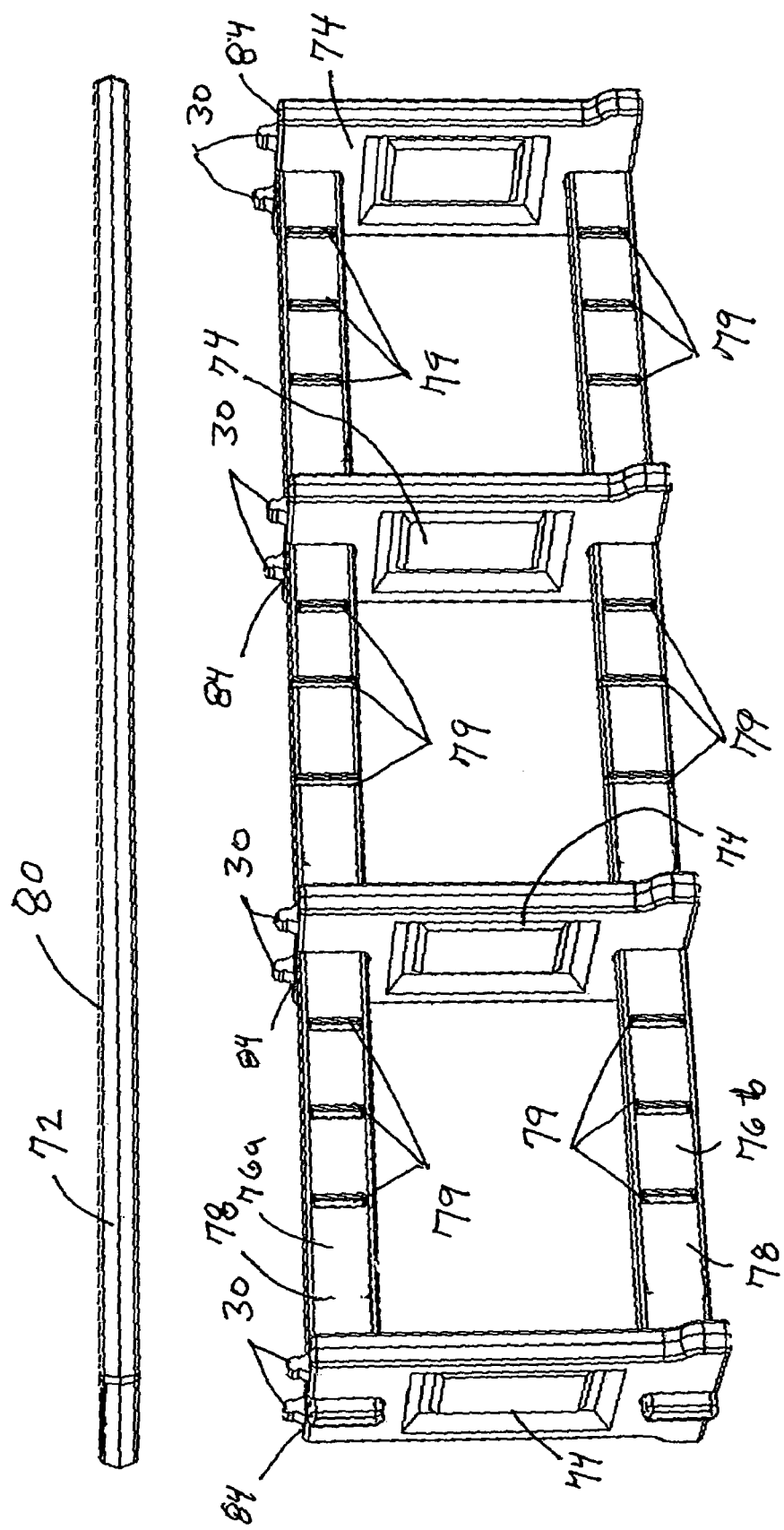
FIG. 22 is a left perspective view of the horizontal support member separated from the vertical support members.
Figure 23:
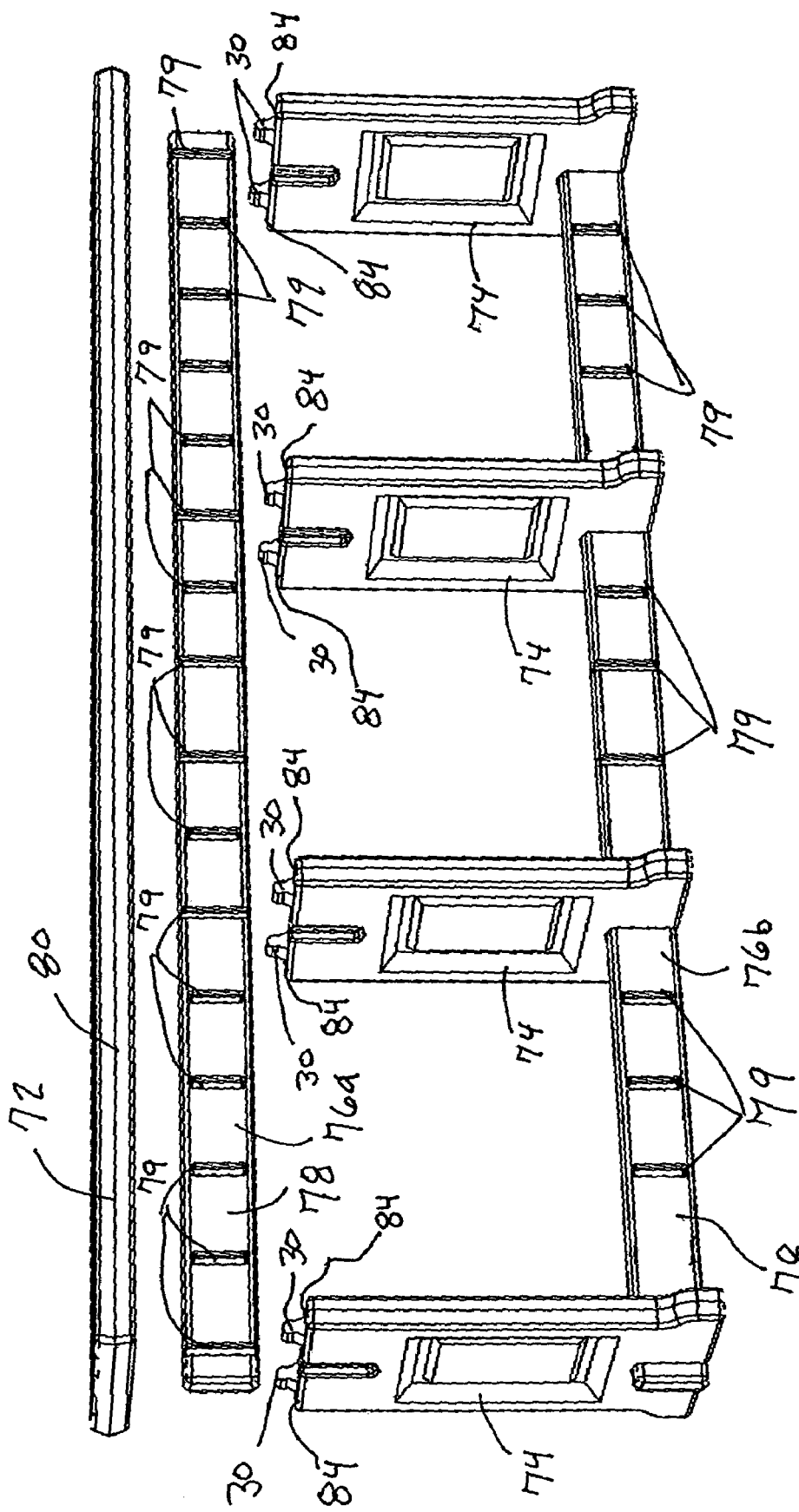
FIG. 23 is a partly exploded view showing the horizontal support member and a first beam separated from the vertical support members.
Figure 24:
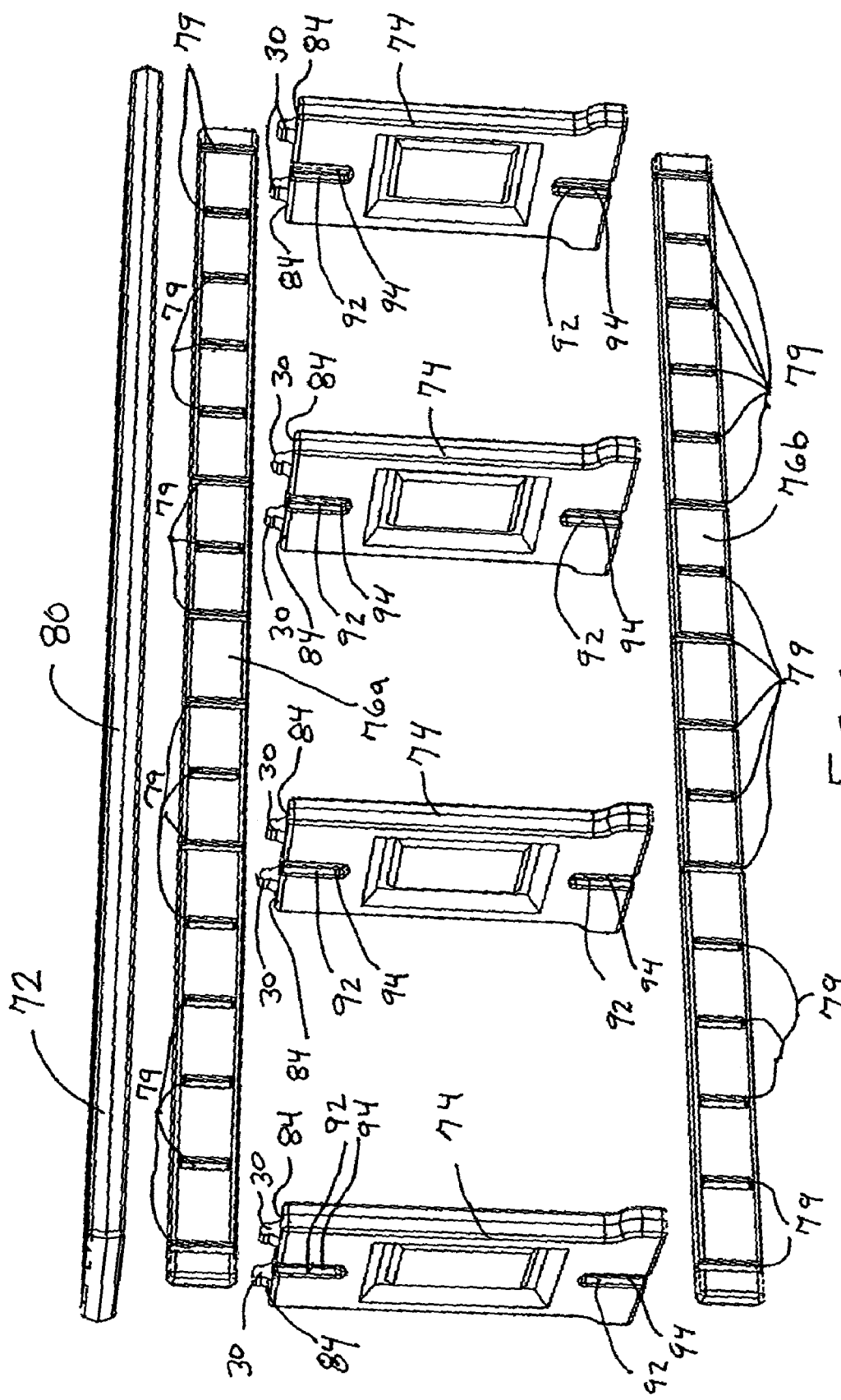
FIG. 24 is an exploded view showing the horizontal support member, vertical support members, and the first and second beams.

FIGS. 17-27 show one of the embodiments of the releasably joinable indented female connector 16 and male connector 30 used to form a structure 46. In particular, shown in FIGS. 17-18 is a structure 46 that can be used as a counter, a table, a bar, a storage surface, a book shelf, or a support for virtually any object(s). Although the structure 46 shown in these drawings could be used for any of a plurality of purposes, structure 46 is, for the sake of convenience, hereinafter referred to as a table 70. The table 70 shown in FIGS. 16 and 17 is constructed from components 68 comprising a horizontal support member 72, a plurality of vertical support members 74, a first beam 76a, and a second beam 76b.

The horizontal support member 72 has a support side 80 and a connector receiving side 82. Formed in the connector receiving side 82 of the horizontal support member 72 are a plurality of spaced apart indented female connectors 16, as shown in FIGS. 18-21. These indented female connectors 16 are fully described above.

The vertical support members 74 each have a male connector side 84 and a base side 86. Spaced apart male connectors 30 extend from the male connector side 84 as shown in FIGS. 18-25. The male connectors 30 are fully described above.

Figure 25:
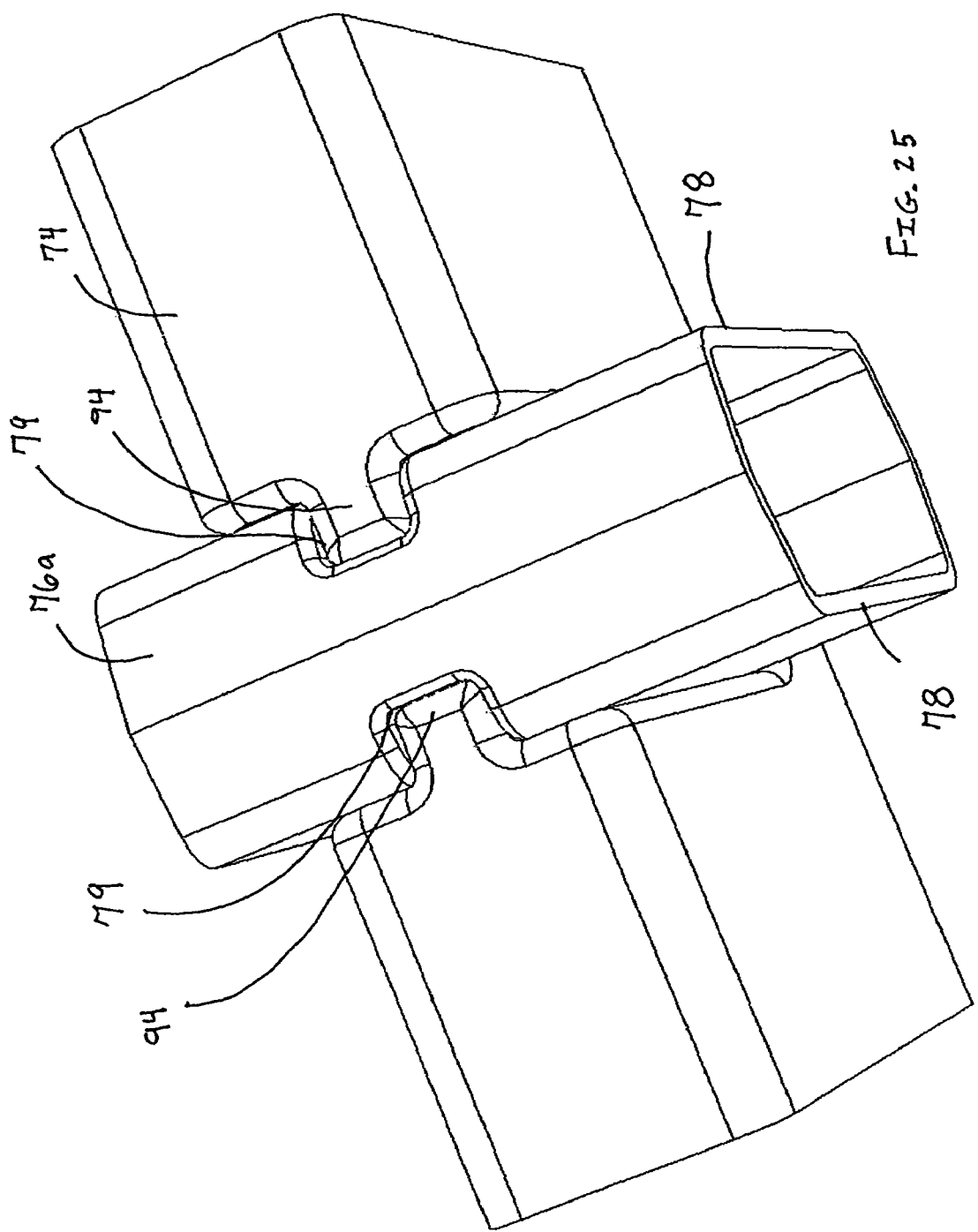
FIG. 25 is a perspective view, partly in section, of the first beam received in one of the vertical support members.
Figure 26:
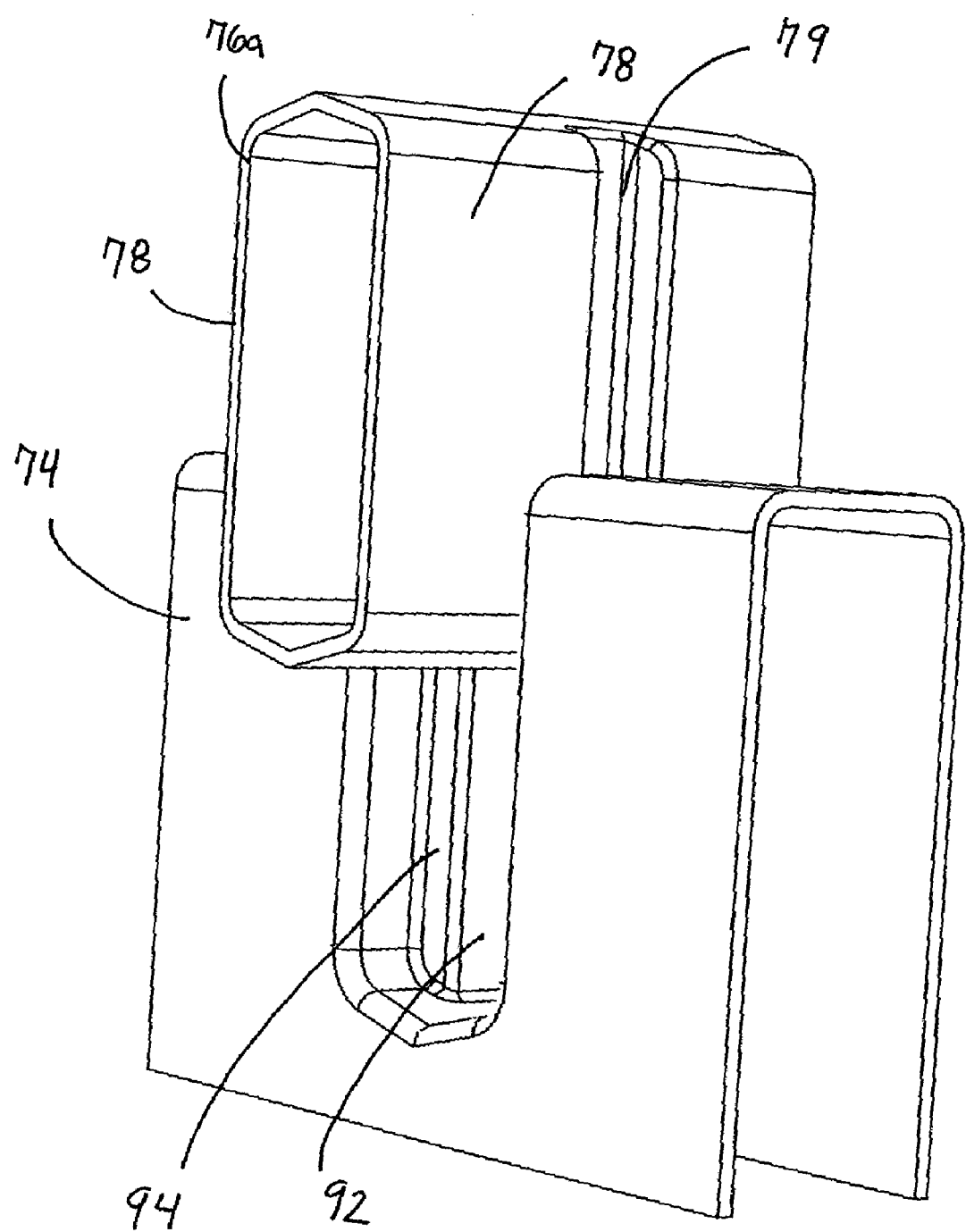
FIG. 26 is a perspective view, partly in section, of the first beam partly received in one of the vertical support members.
Figure 27:
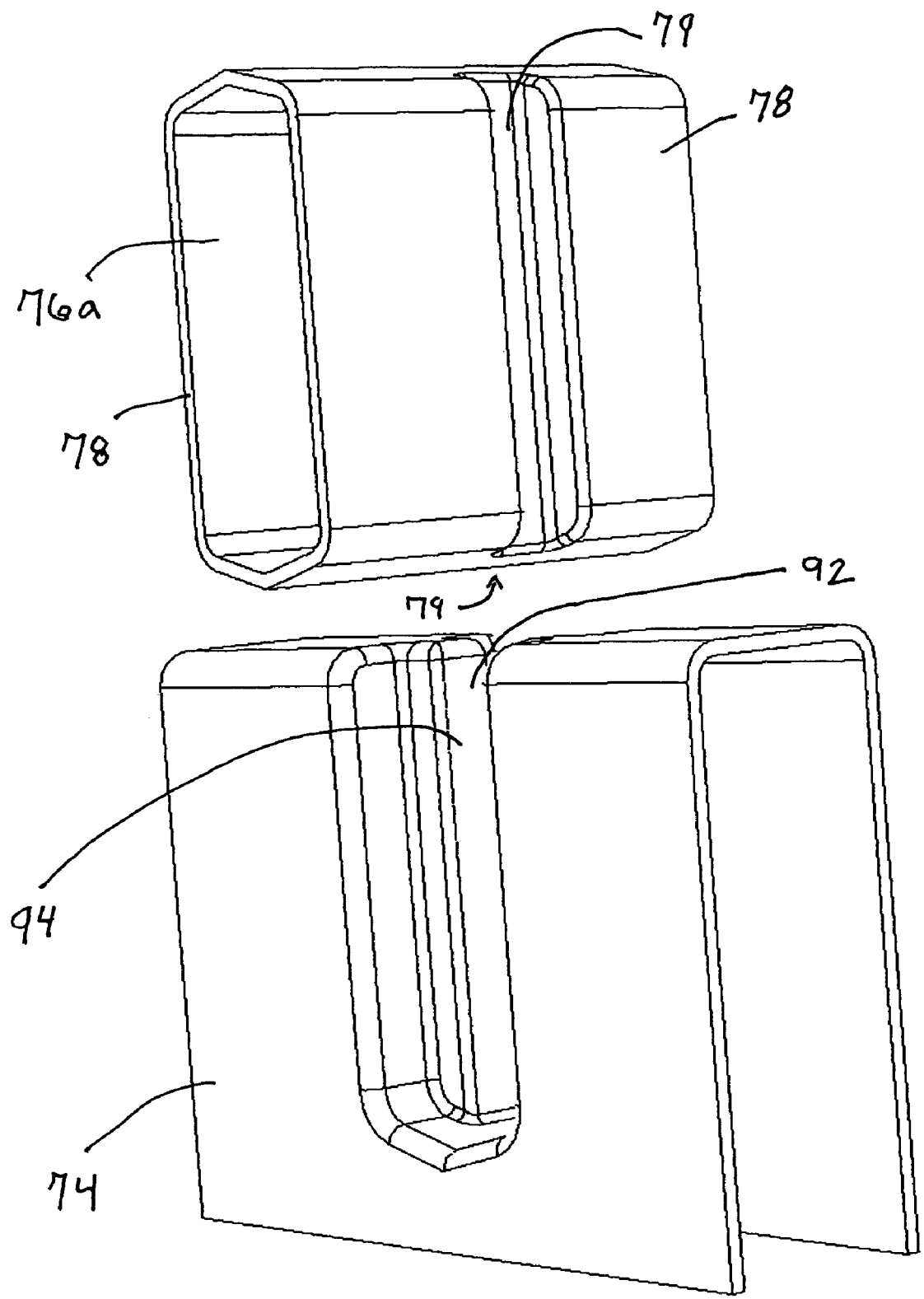
FIG. 27 is a perspective view, partly in section, of the first beam aligned with a recess formed in one of the vertical support members.

The first and second beams, 76a, 76b, respectively, are shown in FIGS. 16-27, and are for providing additional stability to the table 70. Each of the first and second beams 76a, 76b, respectively, has a pair of opposed beam sides 78. Formed in the pair of opposed beam sides 78 are a plurality of spaced apart grooves 79. The grooves 79 are aligned with one another on opposite sides 78 of the first beam 76a and on opposite sides of the second beam 76b, as shown in FIG. 25. The vertical supports 74 have openings 92 formed in them and have guides 94 that extend into the openings 92, as shown in FIGS. 25-27.

The table 70 can be constructed by one person in a matter of minutes from the above-described components without the use of tools, hammers, equipment, and/or other parts or pieces. The first step is to align the first and second beams 76a, 76b, respectively, with the openings 92 defined in the vertical supports 74. Then, the first beam 76a is moved into the openings 92, such that the guides 94 are received in the grooves 70. The first beam 76a and vertical support 74 are held together by a friction fit. The same process is used to join the second beam 76b to the vertical supports 74.

Then, the horizontal support 72 is aligned with the vertical supports 74, such that the indented female connectors 16 formed in the connector receiving side 82 side of the horizontal support 72 are aligned with the male connectors 30 extending from the male connector side 84 of the vertical supports 74. Then, pressure or force is applied to the support side 80 of the horizontal support 72, and the male connectors 30 move into the indented female connectors 16. The male connectors 30 and indented female connectors 16 are joined to one another and a sturdy table 70 is thus formed. Some of the advantages of the table 70 are that no tools were required to assemble the table 70, the completed table 70 is rigid and strong, and that the table 70 can be repeatedly disassembled and reassembled. Disassembly of the table 70 is desirable if the table 70 needs to be stored.

Figure 28:
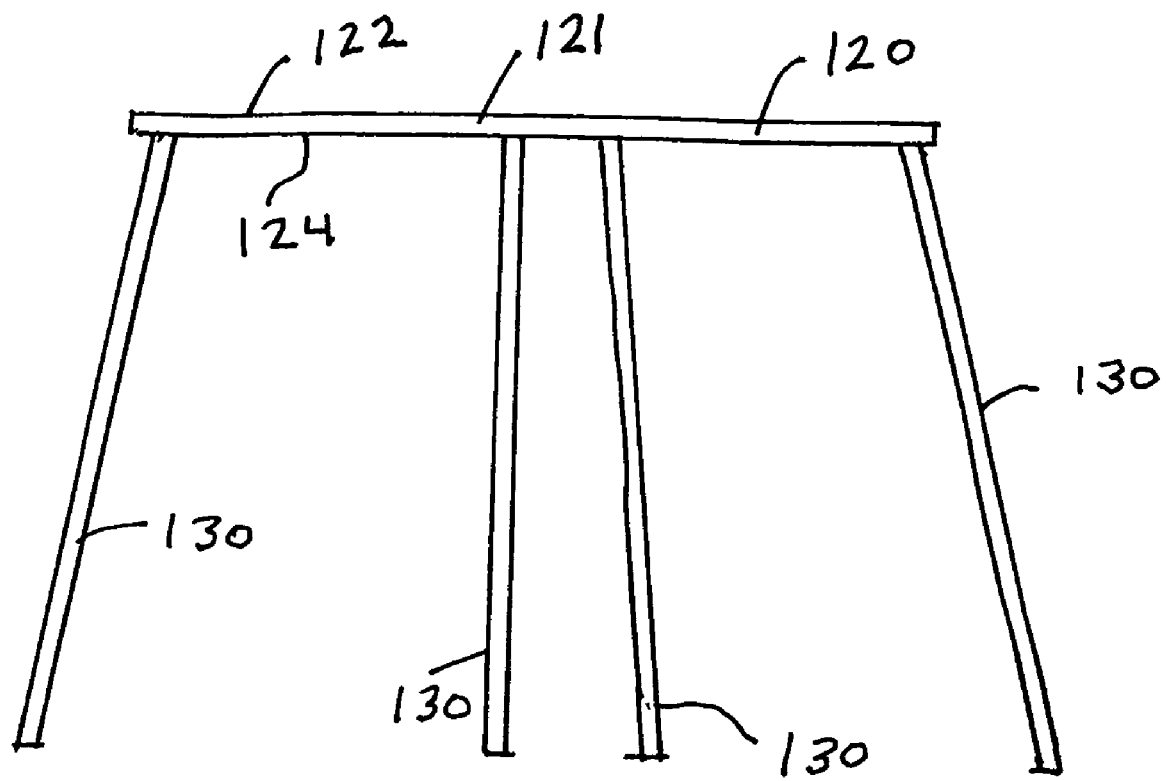
FIG. 28 is a front elevation of a four legged stool.
Figure 29:
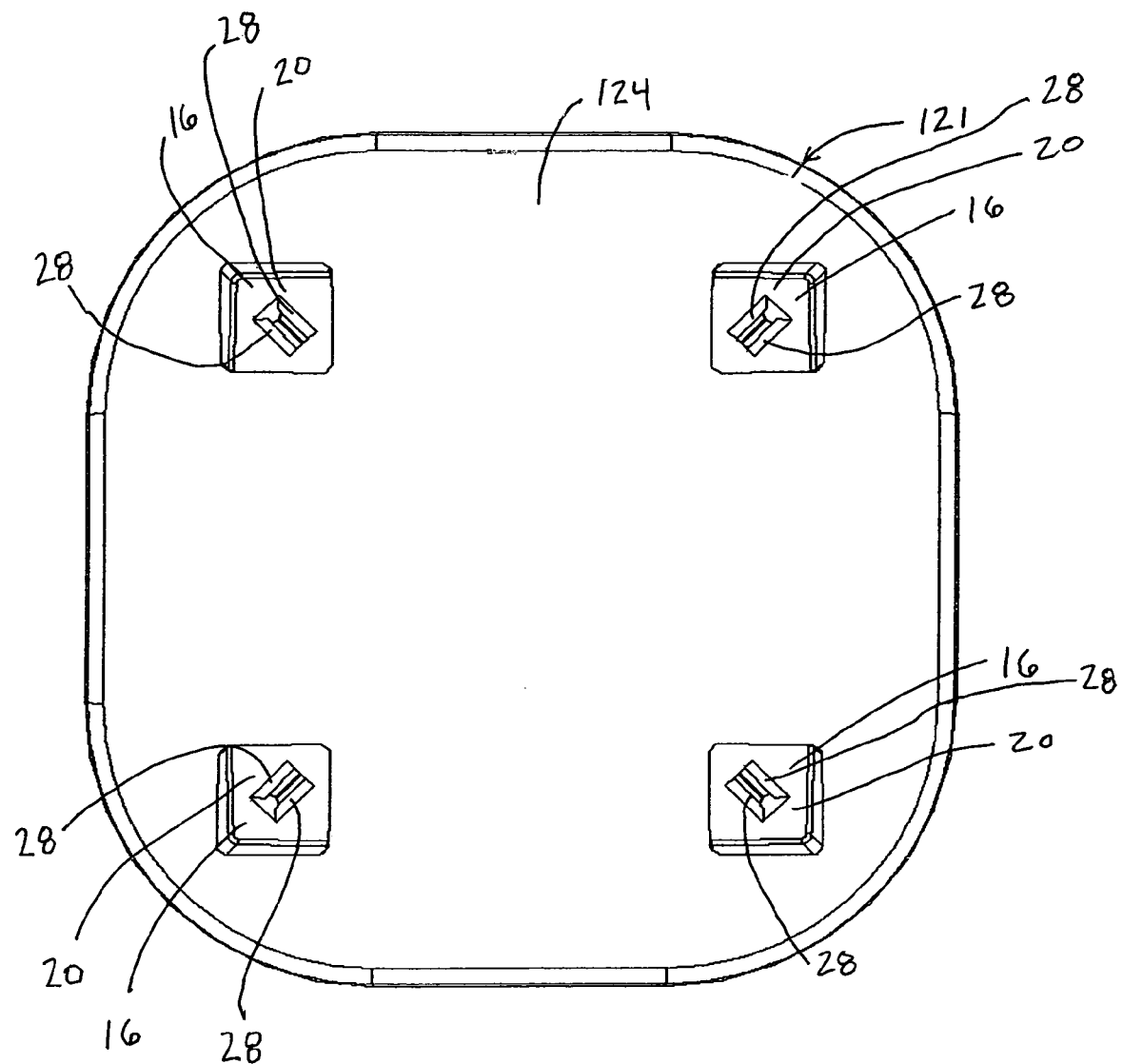
FIG. 29 is a bottom plan view of the seat of the stool.
Figure 30:
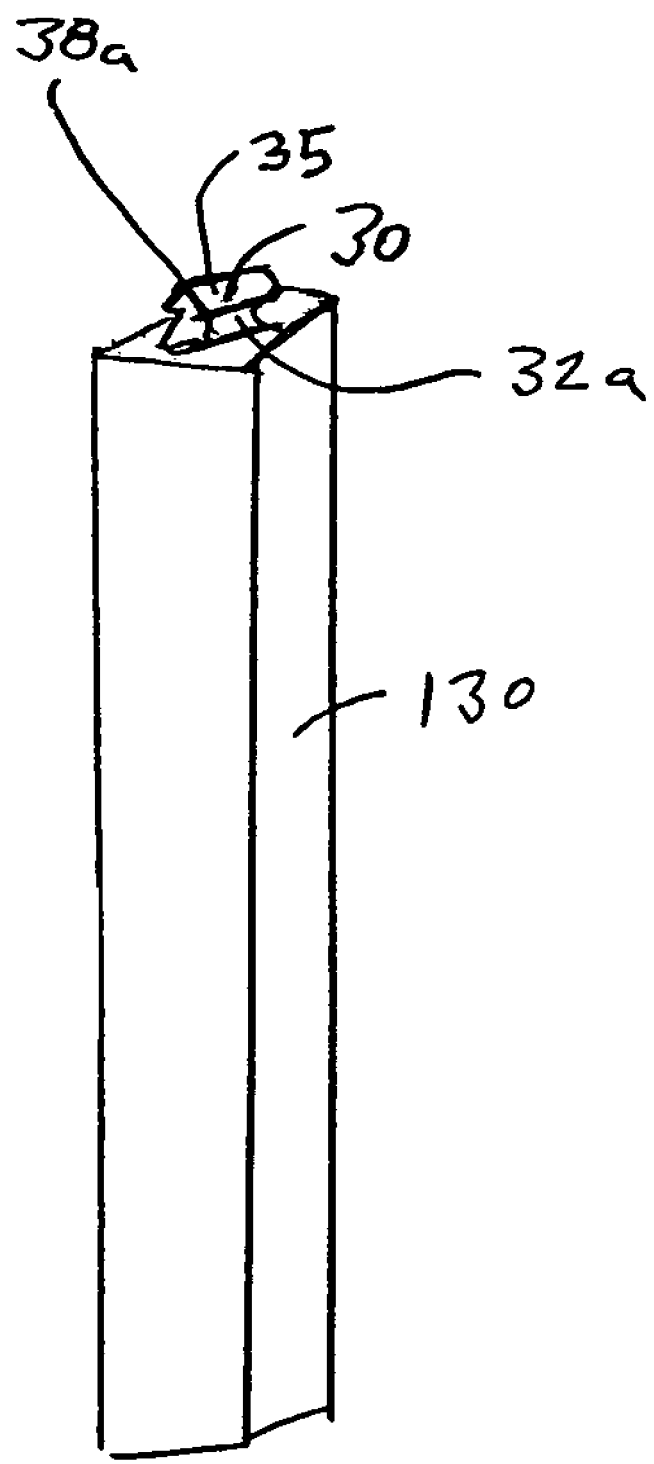
FIG. 30 is a perspective view of a leg of the stool.

In another embodiment, the structure 46 comprises a stool 120 that is held together with male connectors 30 and indented female connectors 16, as shown in FIGS. 28-30. The stool 120 comprises a seat 121 having a load side 122 and a leg side 124. The leg side 124 comprises four indented female connectors 16 that are spaced at substantially equal distances from one another, as shown in FIG. 29. The indented female connectors 16 are recessed in the leg side 124 of the seat 121. Additionally, the upper or first walls 20 formed in the leg side 124 of the seat 121 that the indented female connectors 16 extend into are angled or sloped with respect to the leg side 124 of the seat 121, such that when legs 130 are joined to the female connectors 16 the legs 130 extend in a direction away from the seat 121. This allows the legs 130 to flare outwardly as shown in FIG. 28, providing for a more stable stool 120.

Figure 31:
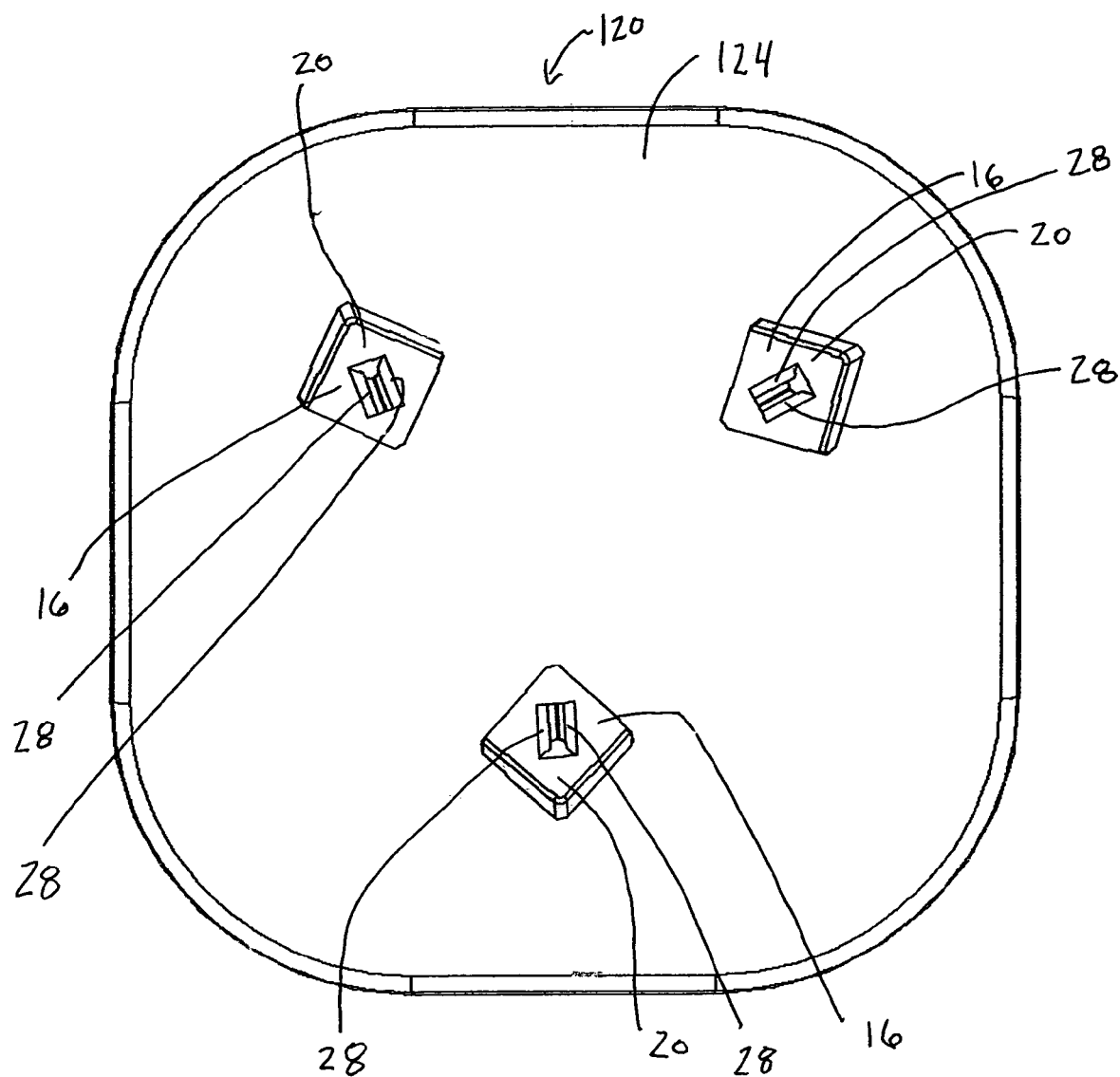
FIG. 31 is a bottom plan view of a three-legged stool.
Figure 32:
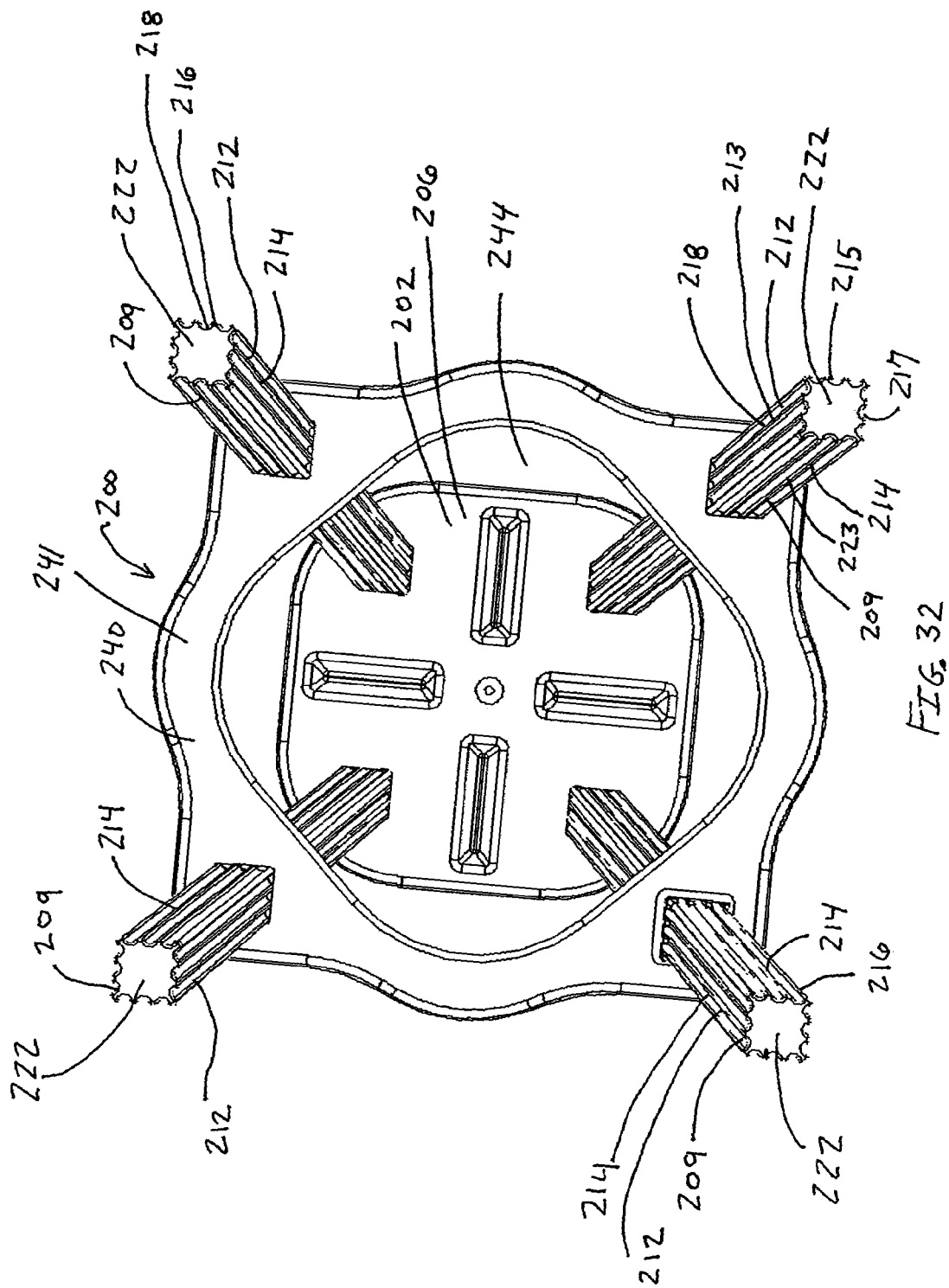
FIG. 32 is a bottom plan view of a braced stool.

The legs 130 are each provided with a male connector 30, as shown in FIG. 30, extending from one end thereof. The male connector 30 on each leg 130 is fitted into and joined to one of the indented female connectors 16. The stool 120 is formed when the four legs 130 have each been forced into the indented female connectors 16. One of the advantages of the stool 120 is that no tools, part, pieces, equipment, or loose fasteners were required to assemble the stool 120. Another advantage of the stool 120 is that the stool 120 can be repeatedly manually assembled and disassembled. Another advantage of the stool 120 is that once the male connector 30 on the 130 is fitted into the indented female connector 16, there is little play or room for movement between the two, and a result the stool 120 can support the weight of an adult person without collapsing. In another embodiment, the stool 12 may comprise three legs 120 that spaced at substantially equal distances from one another, as shown in FIG. 31. FIG. 31 shows a bottom plan view of a stool seat that has three indented female connectors 16 for joining to three legs 130. There is also a method of making a structure using first and second hollow molded objects, 10, 11, respectively. The method comprises providing the first hollow object 10 with an indented female blow-molded connector comprising 16 having at least one rib 28. Providing the second hollow molded unit with a male connector 30 having first and second contact walls 33a, 33b, respectively, that meet with a curved wall 35 at first and second contact edges 38a, 38b, respectively. The method includes moving the male connector 30 into the indented female connector 16 until the first and second contact edges 38a, 38b, respectively move past the at least one rib 28, thus joining the first and second hollow molded objects, 10, 11, respectively.

In one of the preferred embodiments of the invention, a braced four-legged stool 200 (hereinafter braced stool 200) is provided as generally shown in FIGS. 32-45. The braced stool 200 has a seat 202, legs 212, and a brace 240, each of which can comprise blow-molded plastic.

Figure 33:
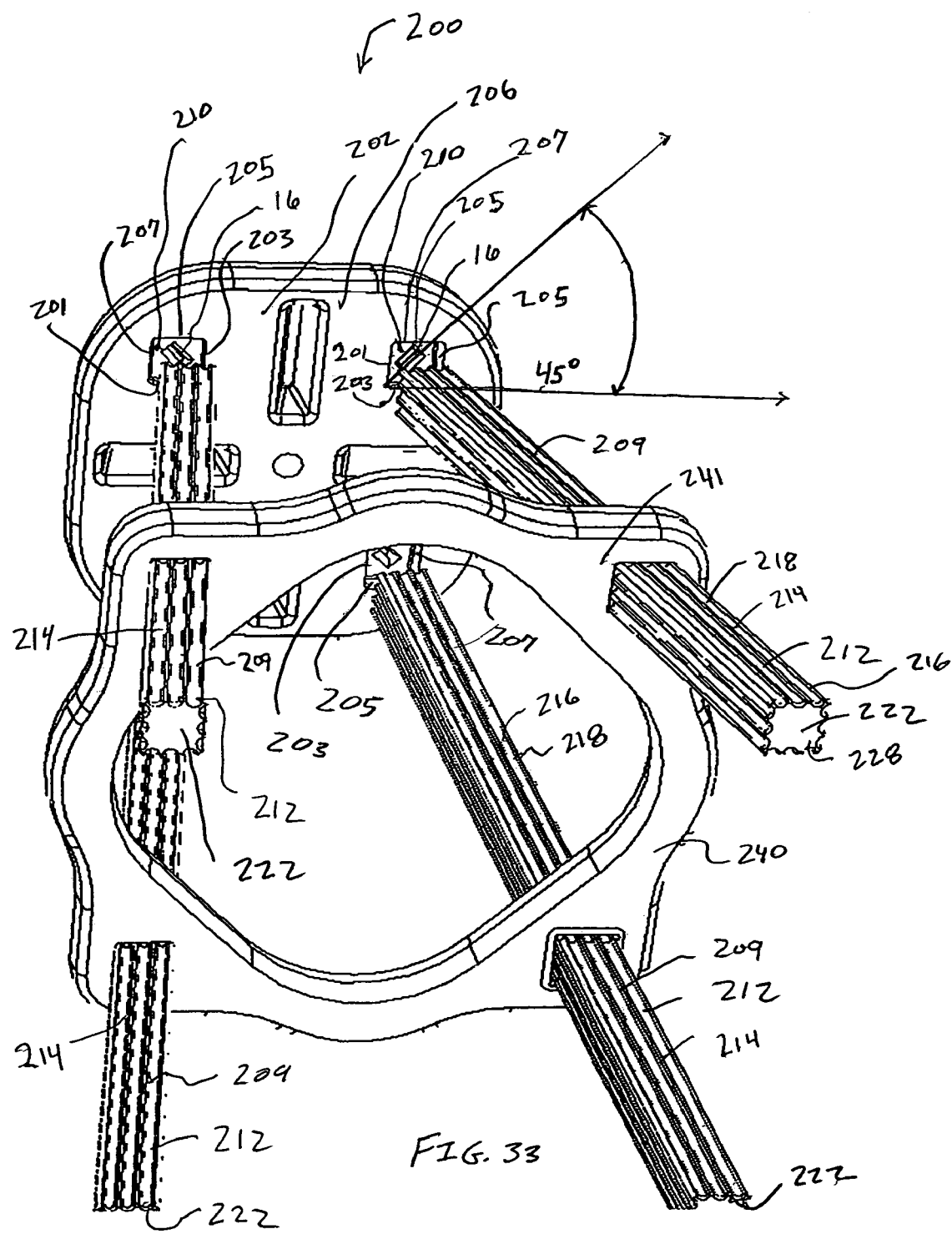
FIG. 33 is a bottom perspective partly exploded view of the braced stool.
Figure 34:
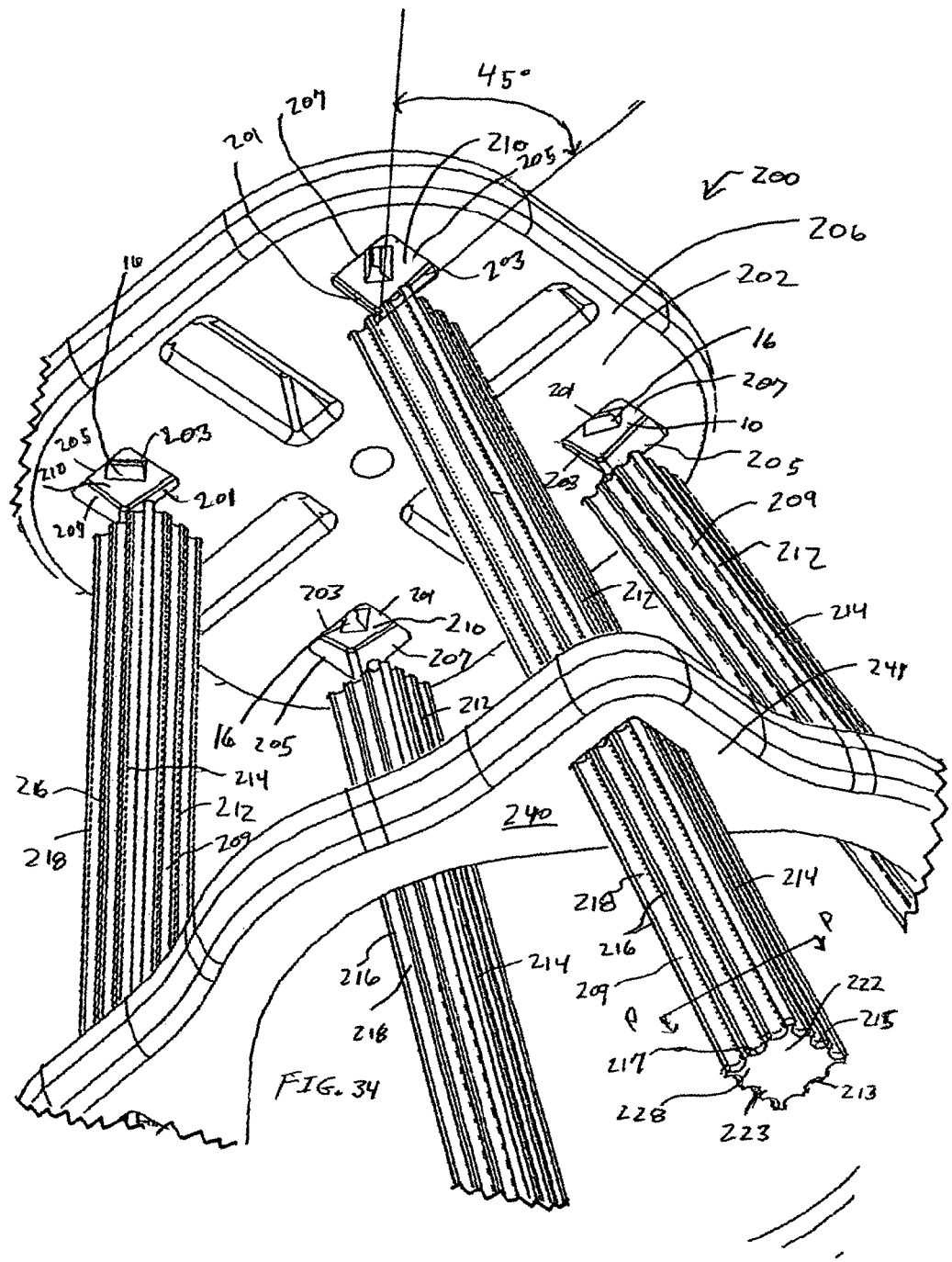
FIG. 34 is bottom perspective partly exploded view of the braced stool.

As shown in FIGS. 32-37 the seat 202 of the braced stool 200 has a load side 204 and a leg side 206. The leg side 206 comprises four indented female connectors 16, and as shown in FIG. 34, that are spaced at substantially equal distances from one another. The indented female connectors 16 are recessed in the leg side 206 of the seat 202, and are surrounded by first, second, third, and fourth surfaces, 201, 203, 205, and 207, respectively, formed in the seat 202, as shown in FIGS. 33 and 34. The indented female connectors 16 are formed in the seat 202 such that that are at about a forty-five degree (45°) angle, as shown in FIGS. 33 and 34, relative to the first and second surfaces, 201, 203, respectively. This configuration wherein the female connectors 16 are formed such that they are at above-described angle advantageously provides the braced stool 200 with superior strength, because when the male connectors 226 are joined with the female connector 16, the legs 212 of the stool will be better able to withstand compressive and other loading.

Additionally, upper or first walls 210 are formed in the leg side 206 of the seat 202. The indented female connectors 16 are formed such that they extend into the upper or first walls 210, as shown in FIG. 34. Also, the upper or first walls 210 are angled or sloped with respect to the leg side 206 of the seat 202. In one of the preferred embodiments the slope of the upper wall 210 is about twelve and one-half degrees, and in other preferred embodiments the slope may be in the range of about ten degrees to about fifteen degrees. The slope is in the direction of the third surface 205 and fourth surface 207, as shown in FIG. 34. Of course, in an embodiment wherein the above described slope is zero, a somewhat less stable braced stool would result, because the center of gravity of the stool would be higher and because the legs 212 of the braced stool there would be perpendicular to the leg side 206 of the seat 202.

Figure 35:
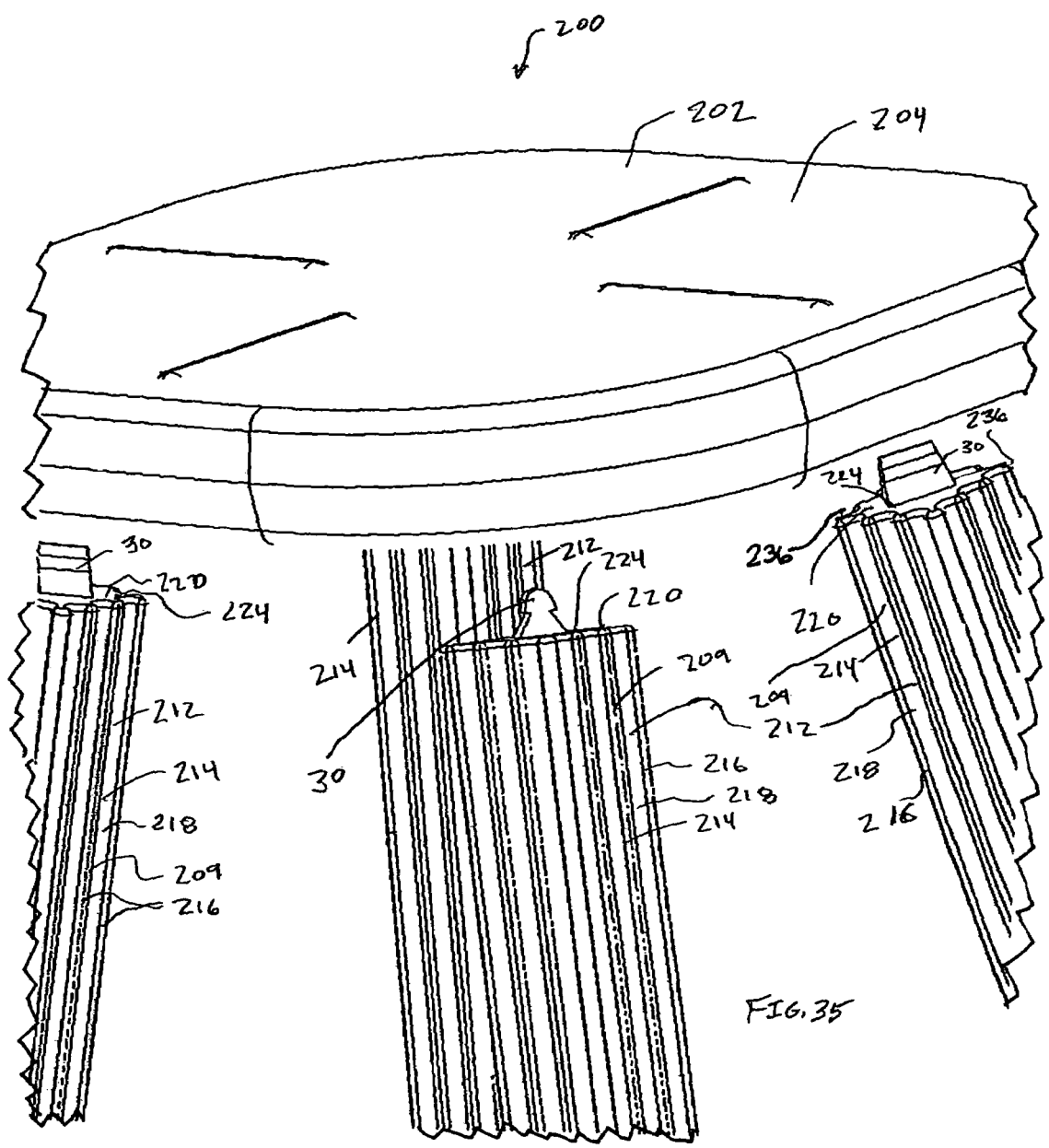
FIG. 35 is a front perspective partly exploded view of the braced stool.
Figure 38:
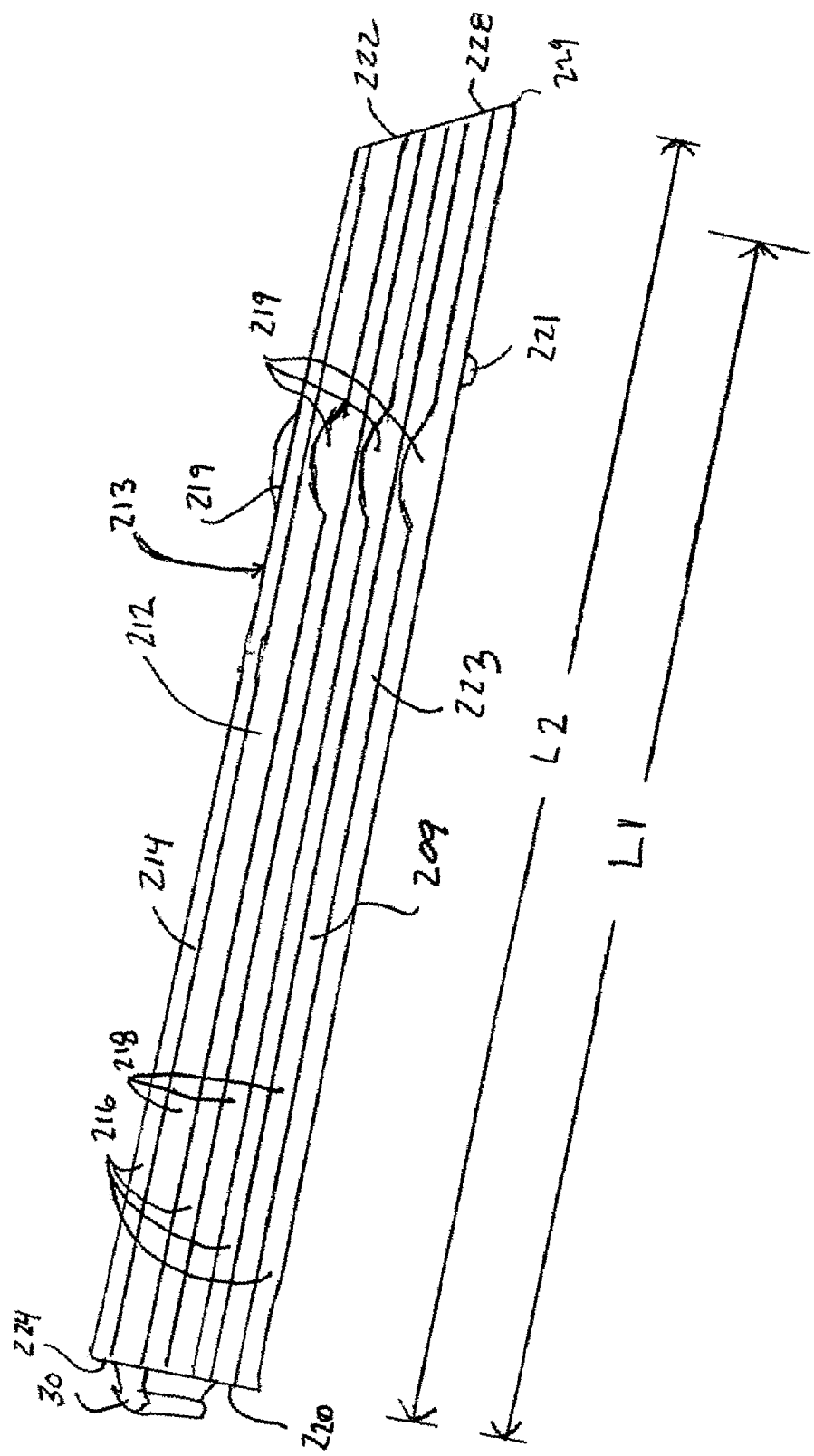
FIG. 38 is a top plan view of a leg of the braced stool.

As shown in FIGS. 35 and 38, legs 212 are provided, and each leg 212 has a first end 220 and an opposed second end 222. The first end 220 has a first end surface 224. The first end surface 224 is substantially perpendicular to the sides 214 of the legs 212. There is also a male connector 30 extending from the first end surface 224, as shown in FIG. 35. The male connector 30 extends from the first end surface 224 and is oriented at about a forty-five degree angle (45°) relative to the sides of the leg 212, as shown in FIG. 35. Thus, when the male connector 30 formed on the leg 212 is moved adjacent to the indented female connector 16 formed in the seat 202, they will be alignable with one another such that the male connector 30 can be received in the female connector 16. Additionally, because the upper wall 210 is sloped, the leg 212 is caused to flare outwardly from the seat 202 when the male connector 30 is joined to the female connector 16 formed in the seat 202. Thus, male connector 30 can be moved into the indented female connector 16 formed in the seat 202. However, the leg 212 is moved through a support brace 240 before it is joined to the seat 202, as will be described presently.

Figure 37:
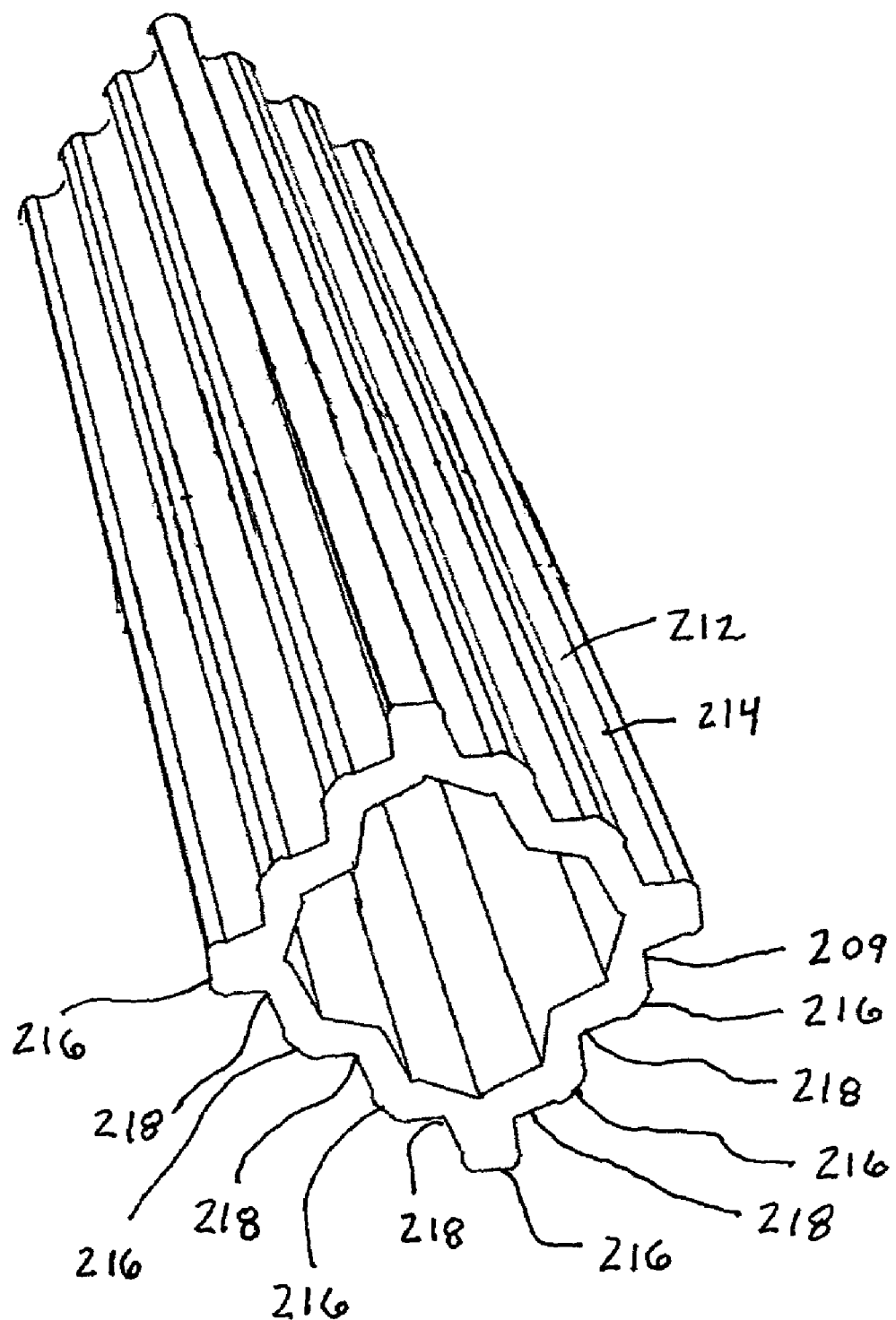
FIG. 37 is a sectional view of a stool leg taken along cut line P-P in FIG. 34.

The legs 212 of the brace stool 200 have sides 214. The legs 212 are hollow and in one of the preferred embodiments comprise blow-molded plastic. As shown in FIGS. 34 and 37, the opposed sides 214 of the legs 212 can, in an embodiment, be parallel to one another. Also, the sides 214 of the legs 212 have corrugations 209 formed in them that extend in the direction of the longitudinal axis of the legs 212. Thus, the sides 214 of the legs 212 are thus formed to have alternating ridges 216 and grooves 218, as shown in FIG. 38, that extend longitudinally or in the direction of the longitudinal axis of the leg 212 from the first end surface 224 to the second end 222 of the leg 212. The alternating ridges 216 and grooves 218 advantageously provide the legs 212 with superior strength, because they resist buckling when the leg 212 is placed under compressive loads, for example, when a person (not shown) sits on the seat 202. Also, the surface area of the leg 212 is increase by the ridges 216 and grooves 218, further increasing the strength of the legs 212. Another advantage of the ridges 216 and grooves 218 is that increased strength is achieved even though less plastic is required to form the legs 212, thus decreasing manufacturing costs.

As shown in FIGS. 34 and 38, the contact surface 228 of the leg 212 is angled. In an embodiment the contact surface 228 can be at about a twelve degree angle, so that the leg 212 can rest flush against a floor it is placed on.

Figure 43:
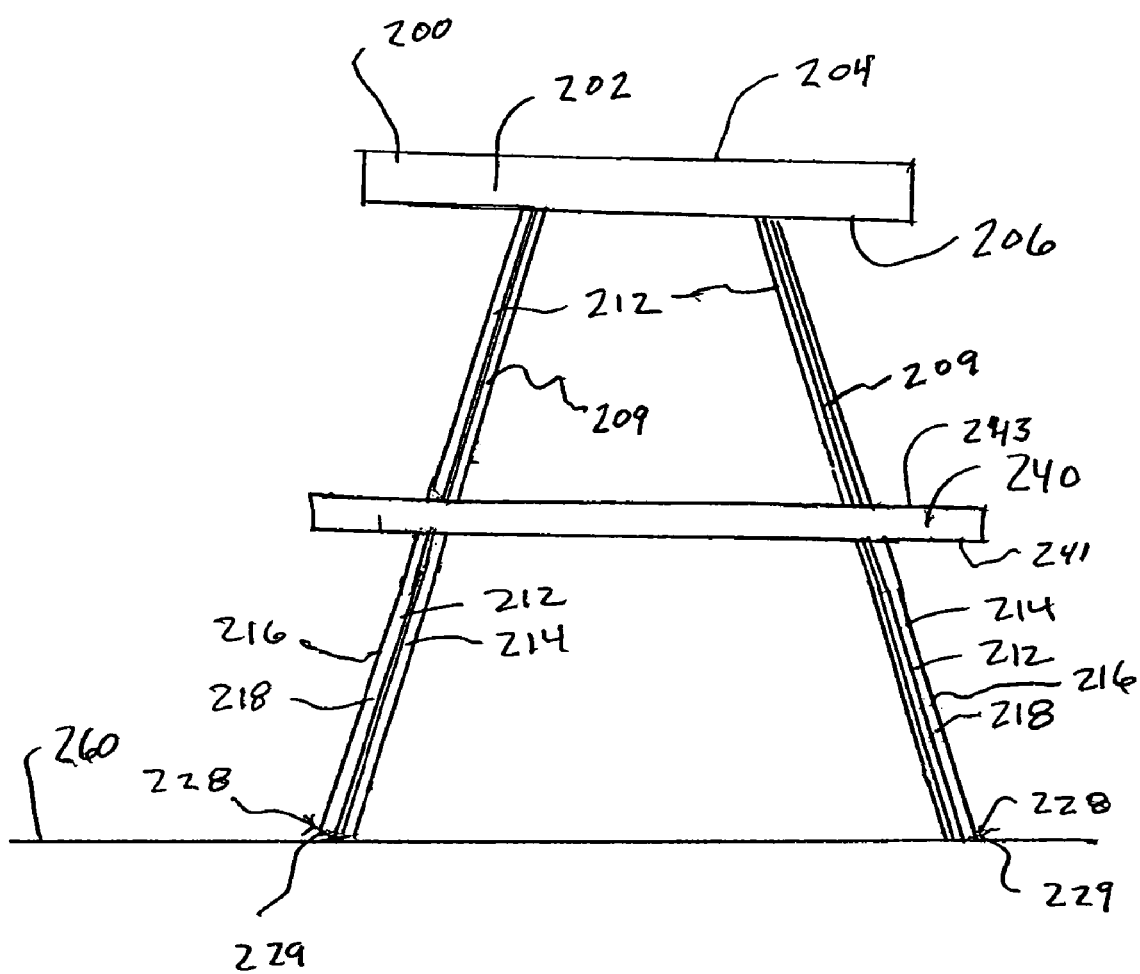
FIG. 43 is a side elevational view of the braced stool on a support surface or floor.

The leg 212 further comprises a first leg side 213, a second leg side 215, a third leg side 217, and a fourth leg side 223, as shown in FIGS. 34 and 38. The first leg side 213 is adjacent the fourth leg side 223, and the first leg side 213 and the fourth leg side 223 are formed with protrusions 219. As shown in FIG. 38, the protrusions 219 are integrally formed in the ridges 216 of the first leg side 213 and fourth leg side 223. Additionally, stops 221 are integrally formed in the second leg side 215 and third leg side 217. The stops 215 are formed in the leg 212 at a position between the protrusions 219 and the second end 222 of the leg 212. The protrusions 219 and stops 221 are used for a purpose to be described presently. As shown in FIG. 38, the leg 212 has a first length designed L1, and a second length designated L2 that is greater than L1. The difference in length between L1 and L2 enables the contact surface 228 of the leg 212 to make flush contact with a support surface 260, for example the ground or floor 260, as shown in FIG. 43. The leg 212 also has a tip 229, and the tip 229 is the portion of the leg 212 that greatest distance from the male connector 30.

Figure 40:
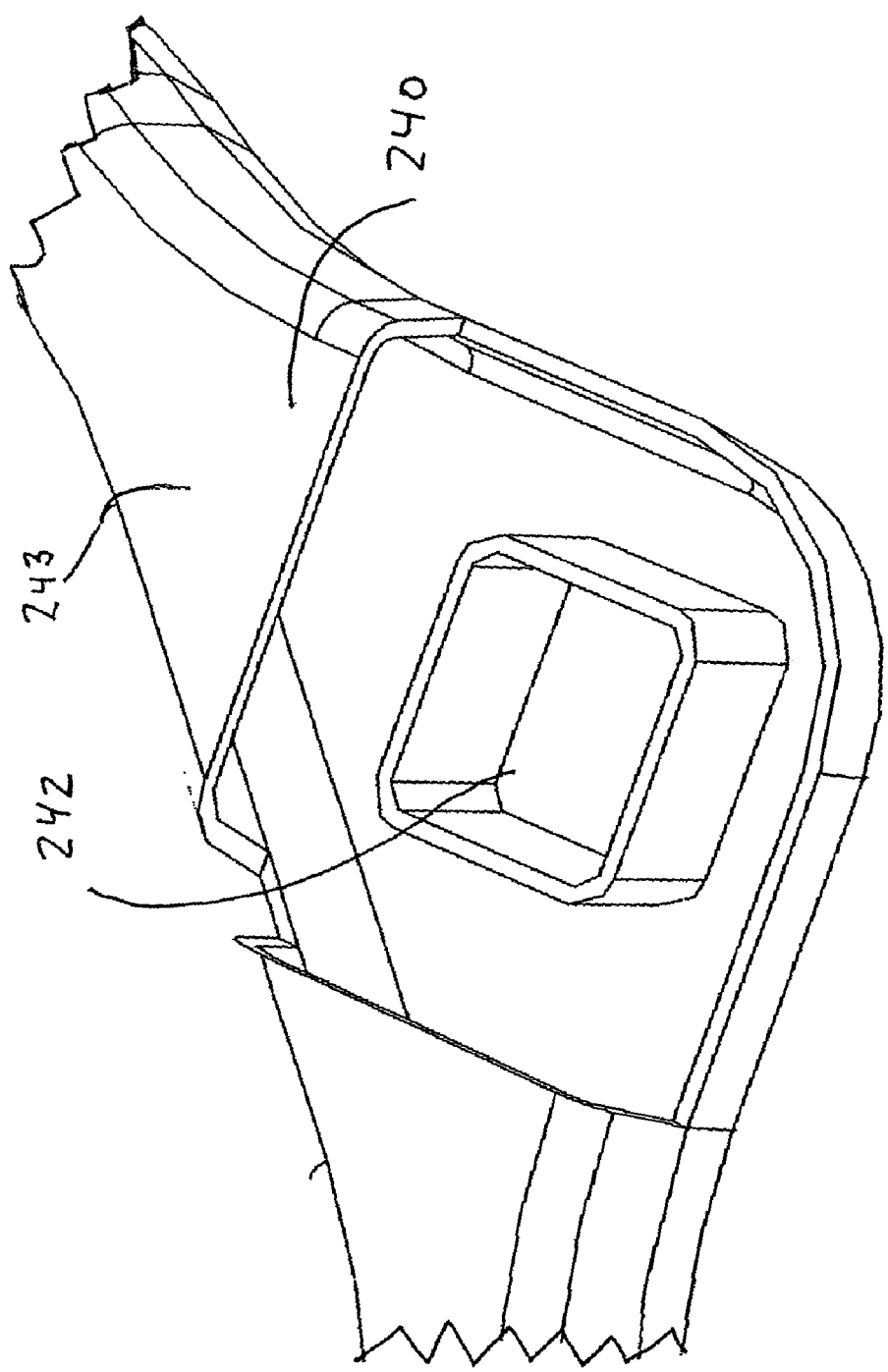
FIG. 40 is a perspective view, partly in section, of a corner of the brace.
Figure 41:
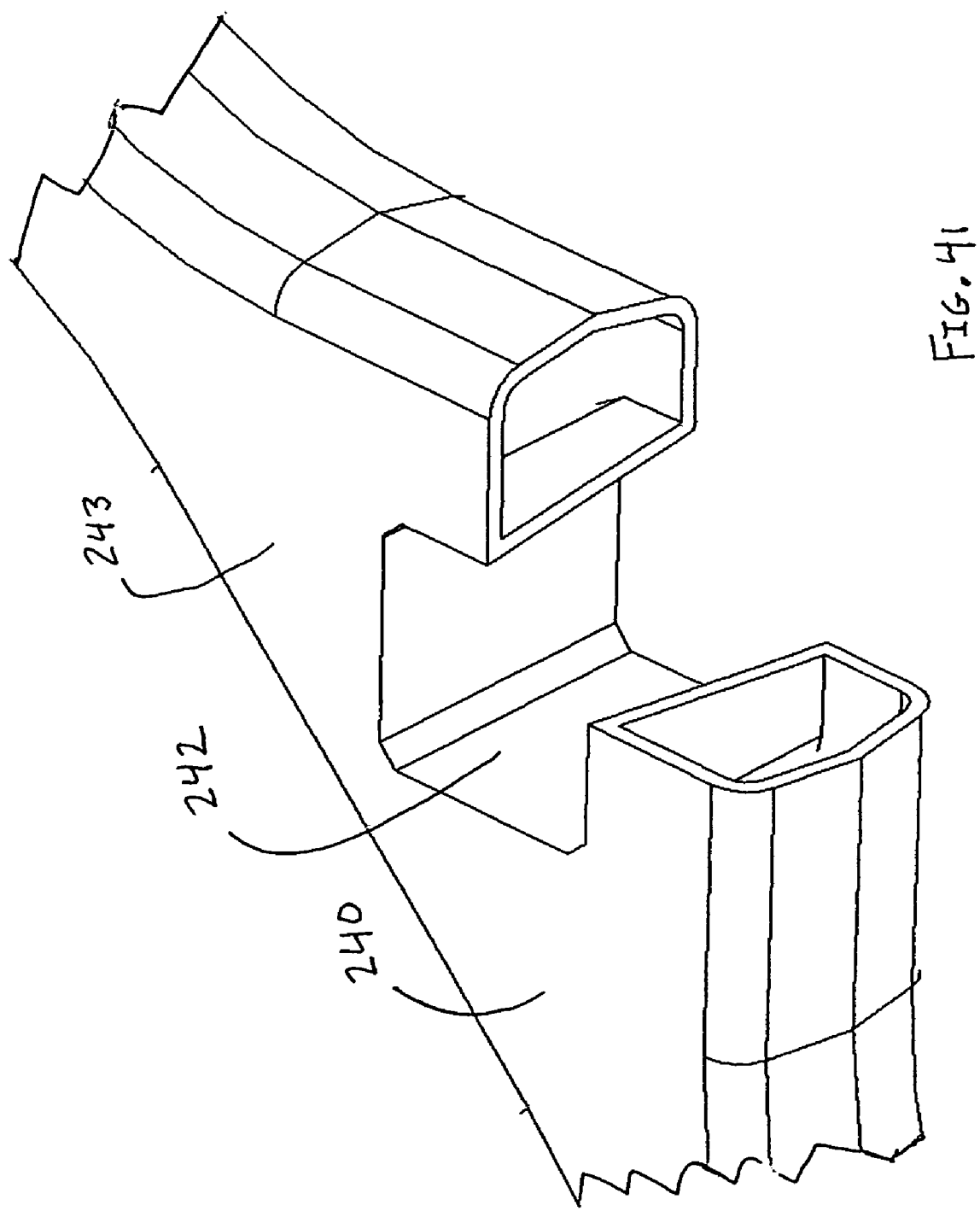
FIG. 41 is a perspective view, partly in section, of a portion of the brace.
Figure 42:
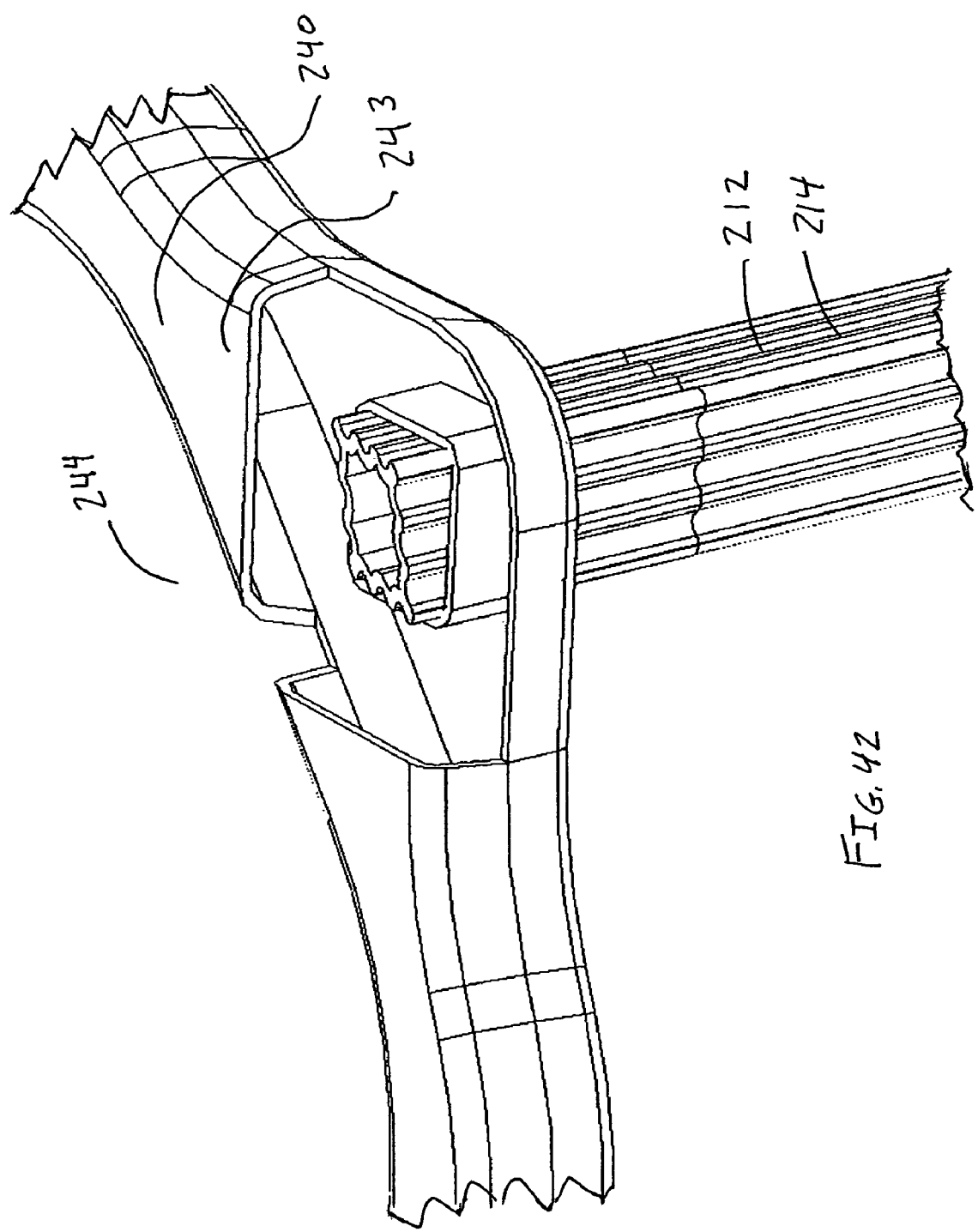
FIG. 42 is a perspective view, partly in section, of a leg received in the an opening defined in the brace.

A support or brace 240 is provided that advantageously provides the braced stool 200 with increased strength, because the brace 240 prevents the legs 212 from moving in a direction away from one another when a load is placed on the seat 202. As shown in FIGS. 32-34, 36, and 39-43, the brace 240 has an insertion side 241 and an exit side 243. The brace 240 has a central opening 244 and also defines openings 242 into which the legs 212 can be moved through and positioned therein. Each opening 242 extends from the insertion side 241 to the exit side 243 of the brace 240. The legs 12 can be manually slid into the openings 242 formed in the brace 240, as will be described presently. FIGS. 40-42 show the brace 240 in detail. As shown in FIG. 41 the brace 240 is hollow and can be formed from blow molded plastic. FIG. 42 show a perspective view of the brace 240 and a leg 212 positioned in the brace 240.

Figure 39:
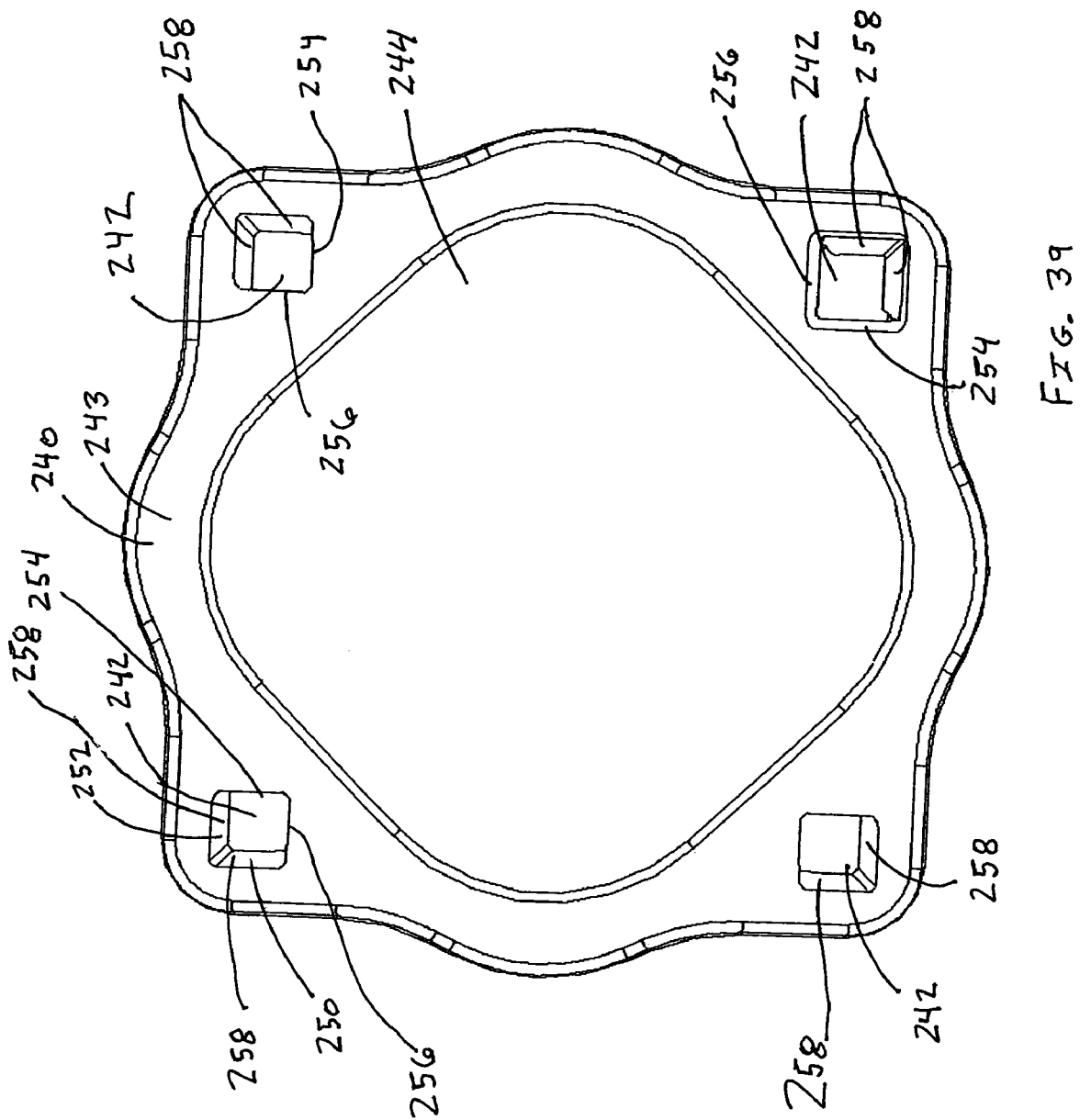
FIG. 39 is a top plan view of the brace.

As shown in FIG. 39, in one of the preferred embodiments, the openings 242 are defined by a first surface 250, a second surface 252, a third surface 254, and a fourth surface 256. In one of the preferred embodiments, the first surface 250 and second surface 252 can each be formed with an integral wedge portion 258, and the third surface 254 and fourth surface 256 are substantially planar. The integral wedge portions 258 extend into the opening 242, and they have their greatest thickness where they meet with the exit side 243 of the brace 240, and become thinner and taper in a direction toward the insertion side 241 of the brace 240. The wedge portions 258 cause a close fitting relationship to be formed between the ridges 216 of the leg 212 and the brace 240 when the leg 212 is moved through and positioned in the opening 242. The wedge portions 258 also cause the leg 212 to move in a direction away from the brace 240, such that the leg 212 slopes away from the seat 202 and away from the brace 240 as it is moved through opening 242. As a result, there is little play in the brace stool 200 between the legs 212 and the brace 240, and thus one of the advantages of the brace 240 is a sturdier, more stable braced stool 200. It is noted that in other embodiments, the wedges 258 are not formed in the brace 240.

Figure 36:
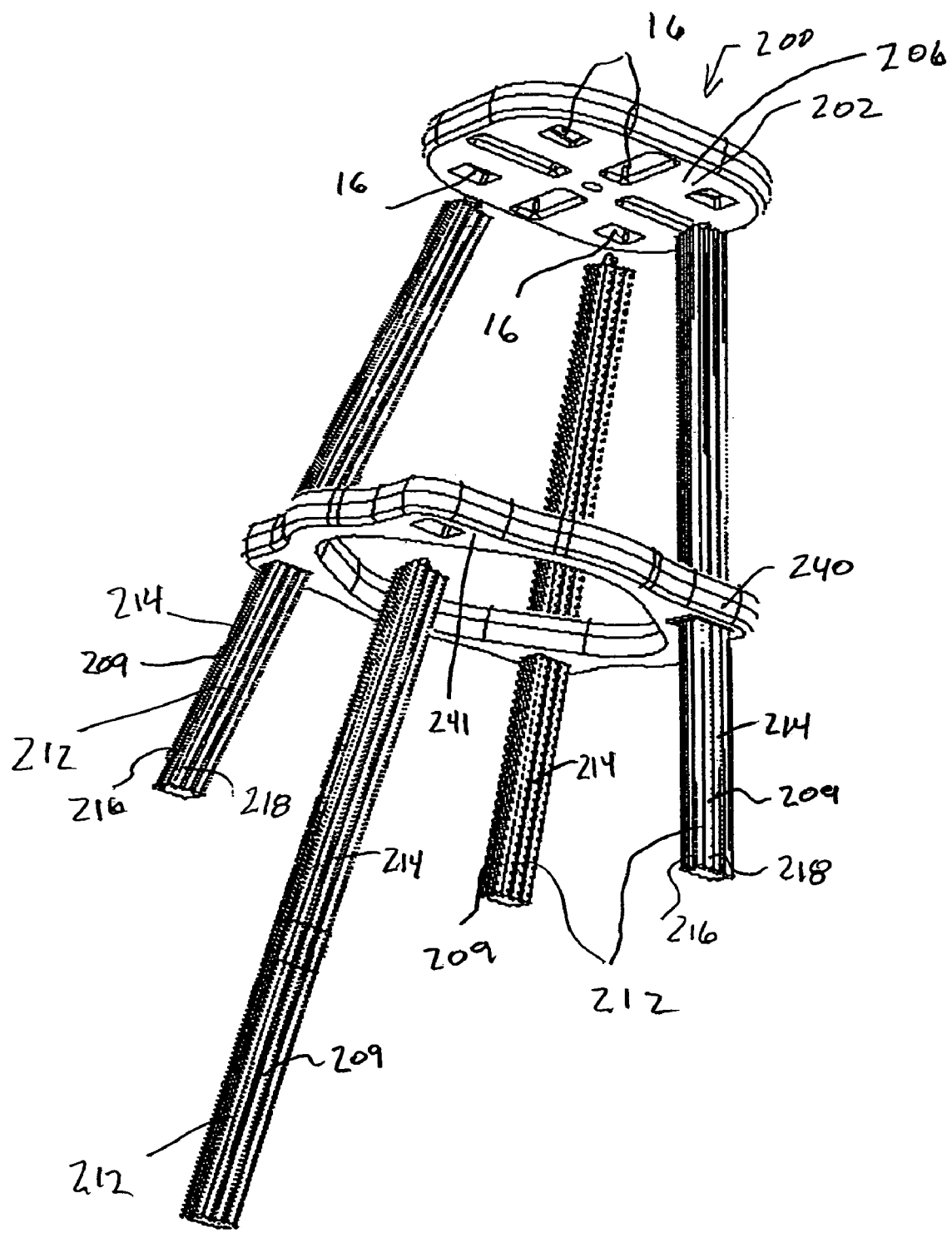
FIG. 36 is a bottom perspective partly exploded view of the braced stool.

To assemble the braced stool 200, reference is made to FIG. 36. As shown, the first end 220 of the leg 212 is rotated and aligned with the opening 242 formed in the insertion side 241 of the brace 240, such that the second leg side 215 and third leg side 217 will contact the wedge portions 258 after insertion of the leg 212 into the opening 242. The male connector 30 and first end 220 of the leg 212 are moved through the opening 242 in the insertion side 241 of the brace 240. Insertion of the leg 212 into the opening continues and the male connector 30 moves through the brace 240 and out the exit side 243 of the brace 240. As the leg 212 continues to be moved through the brace 240, the wedges 258 cause the leg 212 to be at an acute angle relative to the exit side 243 of the brace 240, as shown in FIGS. 36, 42, and 43.

As the leg 212 continues to be moved through the brace 240, the protrusions 219 formed in the ridges 216 of the first leg side 213 and fourth leg side 223 contact the insertion side 241 of the brace 240. The protrusions 219 serve to stop the continued movement of the leg 212 through the opening 242. The same method is carried out for inserting the remaining legs 212 in the brace 240, until all four legs 212 are inserted into the brace 240. It is noted that the stops 221 are integrally formed the second leg side 215 and third leg side 217 between the protrusions 219 and the second end 222 of the leg 212. The stops 221 prevent a user from inserting the second end 222 of the leg 212 into the brace 240, thus decreasing the likelihood of a user improperly assembling the stool 200. It is noted that the above-described positioning and movement of the legs 212 into the openings 242 can be manually accomplished.

Then, the male connectors 30 provided for on each leg 212 are aligned with the female connectors 16 formed in the seat 202, and they are joined together in the manner fully described and set forth above. The braced stool 200 is ready for use.

Thus, one of the advantages of the braced stool 200 is that it can be manually assembled and disassembled without the use of tools or separate fasteners. More advantages of the braced stool 200 are that can be manually disassembled for compact storage, and that it is lightweight yet still has superior strength because of the ridges 216 and grooves 218 formed in the legs 212. Further advantages include the compact storage of the braced stool 200 when disassembled, because in one of the embodiments, the seat 202 can be fitted into the central opening 244 defined in the brace 240. Additionally, the brace 240 advantageously prevents the legs 212 from moving away from one another when a load is imposed on the seat 202, thus allowing the braced stool 240 to be study and capable of supporting large loads.

It is noted that a person sitting on the braced stool can place a foot on the brace 240, and this would increase the interference fit between the leg 212 and brace 240. But, the braced stool 200 can still be manually disassembled without the use of tools.

Figure 44:
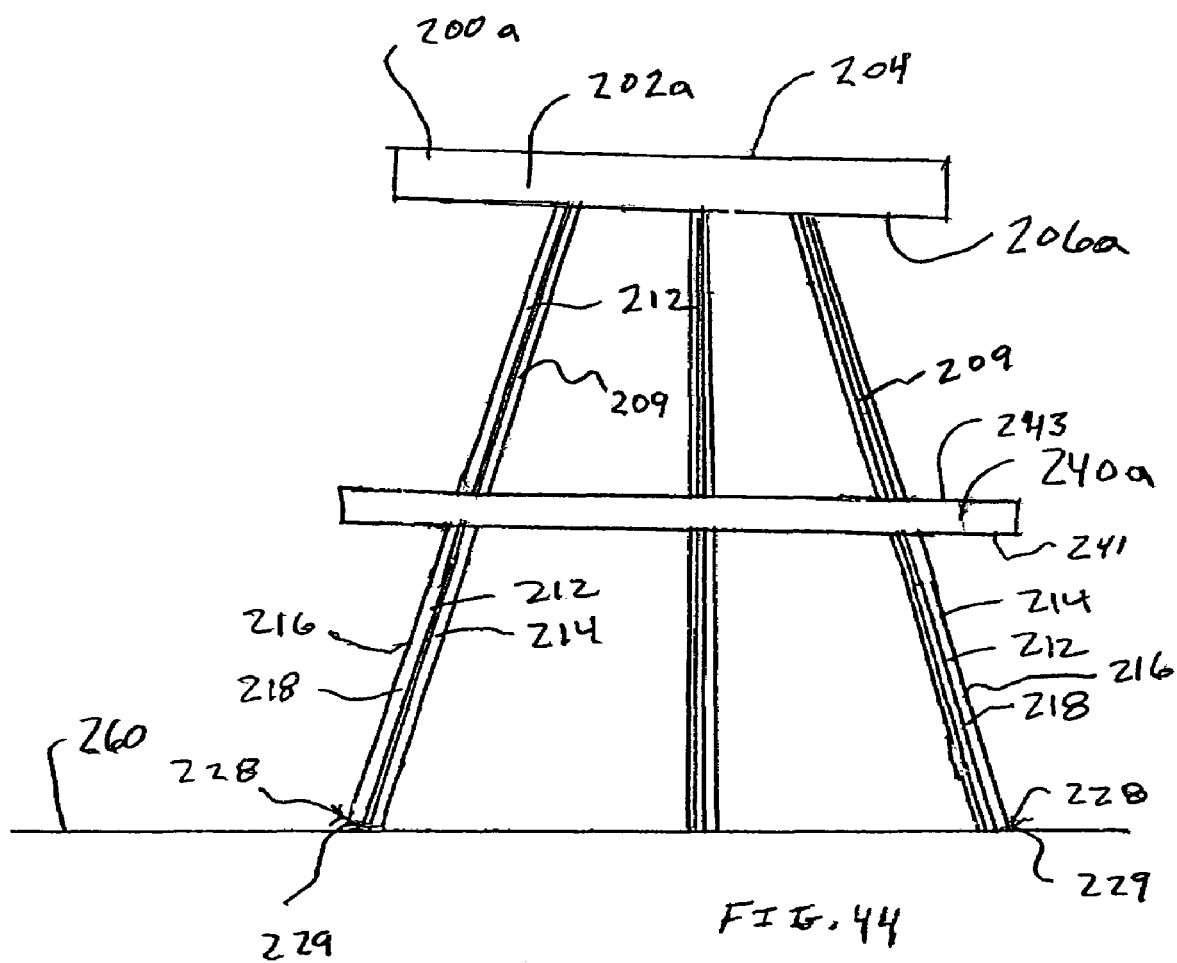
FIG. 44 is a perspective view of a three legged braced stool.
Figure 45:
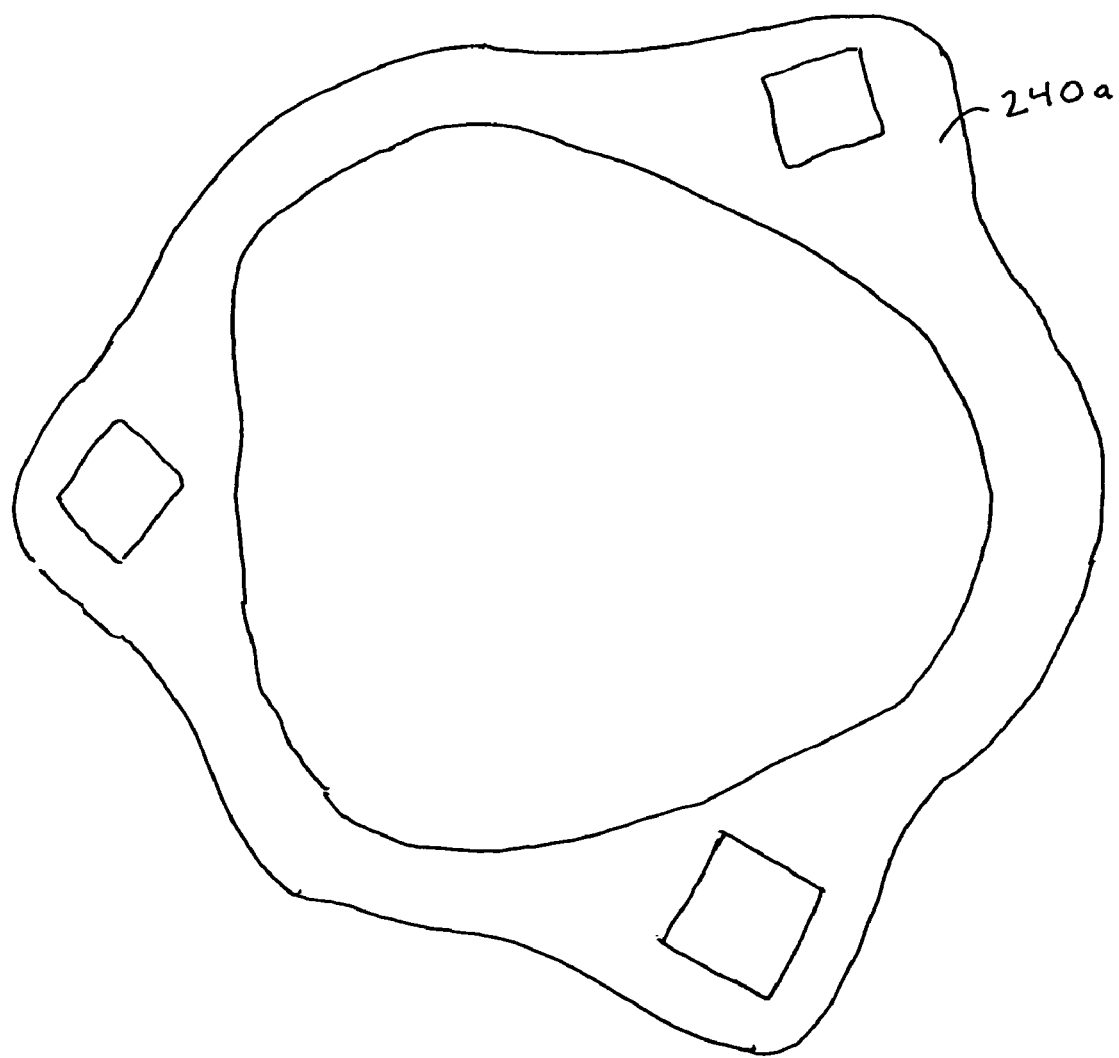
FIG. 45 is a top plan view of the brace for the three legged braced stool.

In another embodiment shown in FIGS. 44 and 45, a three-legged braced stool 200a is provided having seat 202a having a load side 204a and a leg side 206a. The leg side 206a has three indented female connectors 16 formed it that are spaced at substantially equal distances from one another, and are formed such that they are angled and sloped as described above in the previous embodiment. Three legs 212 are provided, and they may be corrugated as described above. A brace 240a is provided that defines three openings 242 spaced at substantially equal distances from one another. There may be wedge portion 258 formed in the brace 240a. The three-legged braced stool 200a is assembled in the same manner as the above-described four-legged braced stool 200. A compact sturdy stool brace stool 200a is provided for that advantageously requires few parts yet can withstand significant loading imposed on the seat 202a.

There is also provided a method of making a braced stool 200 comprising providing a seat 202, legs 212, and a brace 240. The method also includes forming indented female connectors 16 in a leg side 206 of the seat 202 and forming male connectors 30 one end of the legs 212. The method further includes providing openings 242 in the brace 240 for receiving the legs 212, and moving the male connectors 30 formed in the legs 212 through the openings 242, and moving the male connectors 30 into the female connectors 16 and joining them together. The method can further includes providing the legs 212 with corrugations 209 and providing the brace 240 with wedge portions 258 for increasing the stability of the braced stool 200.

Thus, a number of structures 46, such as braced stools 200, can be made that make use of the indented female connector 16 and male connector 30. Advantageously, these structures can be manually assembled and disassembled in a short amount of time with the use of tools or other components. More advantages are that these structures 46 are lightweight and can be mass produced at low production costs. Also, these structures 46 are strong and stable, because there is little play or room for movement between the male connector 30 and indented female connector 16 when they are joined together.

While the indented female blow-molded connector and male connector have been described in connection with certain embodiments, it is not intended to limit the scope of the indented female blow-molded connector and male connector to the particular forms set forth, but, on the contrary, it is intended to cover such alternatives, modifications, and equivalents as may be included within the spirit and scope of the indented female blow-molded connector and male connector as defined by the appended claims.

What is claimed:

1. A stool comprising:
   a) a seat having a load side and a leg side,
   b) an indented female connector formed in the leg side of the seat,
   c) a leg having a first end having a first end surface and a male connector joined to and extending from the first end surface,
   d) the leg further having a second end having a contact surface,
   e) the leg comprising longitudinal ridges and grooves extending between the first end and the second end for providing strength, and
   f) wherein the indented female connector has a first wall having a top surface and a thickness, the first wall surrounding an opening, at least one inner wall extending substantially perpendicular to the first wall and bordering the opening, at least one rib formed in the inner wall, and a bottom wall joined to the inner wall and wherein a distance from the rib to the top surface is greater than the thickness of the first wall such that when the male connector is positioned in the indented female connector the male connector and the at least one rib are interlocked such that the leg and the seat are joined.

2. The stool of claim 1 further comprising plurality legs and a plurality of indented female connectors and further comprising a brace that surrounds the plurality of legs and for preventing the legs from moving apart from one another.

3. The stool of claim 2 wherein the brace defines a plurality of openings so that each leg of the plurality of legs can be fitted into an opening.

4. The stool of claim 3 wherein the brace further comprises an insertion side and an exit side and the openings in the brace extend from the insertion side to the exit side and are for receiving the legs.

5. The stool of claim 4 wherein the leg further comprises a protrusion and wherein the protrusion abuts against the insertion side of the brace when the leg is positioned in the brace, and further wherein each of the openings in the brace is defined by a first surface and a second surface each having a wedge portion with a greatest thickness at the exit side of the brace and each wedge portion tapers in a direction toward the insertion side of the brace and the first wedge and the second wedge for and causing the leg to move in a direction away from the brace and the seat.

6. The stool according to claim 5 wherein the leg further comprises a stop that is feinted between the protrusion and the second end of the leg such that the second end of the leg is prevented from being inserted into the exit side of the brace.

7. The stool according to claim 1 wherein top surface of the indented female connector has a slope of between about ten to about fifteen degrees relative to the leg side of the seat.

8. The stool according to claim 1 wherein the indented female connector is at about a forty five degree angle.

9. The stool according the claim 1 further comprising three corrugated legs and having a brace that defines three openings into which the three corrugated legs are positioned.

10. The stool according to claim 1 further comprising four corrugated legs and having a brace that defines four openings into which the four corrugated legs are positioned.

11. A method of making a stool comprising:
blow molding a seat having a load side and a leg side,
forming at least one indented female blow-molded connector in the leg side,
blow molding a leg having a first end and a second end and forming a male connector that extends from the first end and forming a contact surface at the second end,
forming ridges and groves in the leg and extending the ridges and grooves longitudinally between the first end and the second and providing the leg with a protrusion and a stop such that the stop is positioned between the protrusion and the second end,
blow molding a brace and defining a brace opening in the brace,
providing the brace with an insertion side and an exit side,
moving the first end of the leg through the insertion side of the brace and brace opening until the protrusion contacts the brace and the stop for preventing the first end of the leg from being inserted through the exit side of the brace,
providing the indented female connector with a first wall having a top surface and a thickness such that the first wall surrounds an opening, and providing at least one inner wall such that the at least one inner wall extends substantially perpendicular to the first wall and bordering the opening, and
providing at least one rib formed in the inner wall, and providing a bottom wall and joining the bottom wall to the inner wall and providing a distance from the rib to the top surface to be greater than the thickness of the first wall, such that when the male connector is received in the indented female connector the male connector and the at least one rib interlock to join the leg and the seat.

12. The method of claim 11 further comprising providing three legs and defining three openings in the brace each for receiving one of the legs.

13. The method of claim 11 further comprising providing four legs and defining four openings in the brace each for receiving one of the legs.

14. A stool comprising:
a) a seat having an indented female-blow molded connector having an upper surface,
b) a corrugated leg having a female connector joined to the indented female blow molded connector,
c) a brace having an insertion side and exit side and having an opening defined by a first surface, a second surface, a third surface, and a fourth surface, and wherein each of the first surface and second surface have a wedge portion and the third surface and the fourth surface are substantially planar, and each of the wedge portions extends into the opening in the brace and each of wedge portions has a greatest thickness at the exit side of the brace and taper in a direction toward the insertion side of the brace, and the wedge portions for causing the leg to move in a direction away from the brace such that leg slopes away from the seat, and wherein the opening is for receiving the corrugated leg and the male connector is joined to the indented female blow-molded connector, and
d) wherein the upper surface is sloped between about ten and fifteen degrees.

15. The stool according to claim 14 wherein the corrugated leg further comprises protrusions and wherein the brace further comprises an integral wedge formed in the opening such that the wedge and the brace are one piece.

* * * * *